US012679916B2

(12) United States Patent
Guironnet et al.

(10) Patent No.: US 12,679,916 B2
(45) Date of Patent: Jul. 14, 2026

(54) CATALYST, METHOD OF PREPARATION, AND METHODS INVOLVING HYDROSILYLATION

(71) Applicant: THE BOARD OF TRUSTEES OF THE UNIVERSITY OF ILLINOIS, Urbana, IL (US)

(72) Inventors: Damien Guironnet, Urbana, IL (US); Susannah Miller, Urbana, IL (US)

(73) Assignee: THE BOARD OF TRUSTEES OF THE UNIVERSITY OF ILLINOIS, Urbana, IL (US)

(*) Notice: Subject to any disclaimer, the term of this patent is extended or adjusted under 35 U.S.C. 154(b) by 679 days.

(21) Appl. No.: 18/123,525

(22) Filed: Mar. 20, 2023

(65) Prior Publication Data

US 2023/0295364 A1 Sep. 21, 2023

Related U.S. Application Data

(60) Provisional application No. 63/321,792, filed on Mar. 21, 2022.

(51) Int. Cl.
*C08F 255/00* (2006.01)
*B01J 31/22* (2006.01)
*C07F 7/08* (2006.01)

(52) U.S. Cl.
CPC ......... *C08F 255/00* (2013.01); *B01J 31/2295* (2013.01); *C07F 7/0834* (2013.01); *C07F 7/0836* (2013.01)

(58) Field of Classification Search
CPC ....... B01J 31/2295; C07F 7/34; C07F 7/0836; C07F 7/0834; C08F 255/00
See application file for complete search history.

(56) References Cited

U.S. PATENT DOCUMENTS

| | | | | |
|---|---|---|---|---|
| 3,715,334 | A | | 2/1973 | Karstedt |
| 3,775,452 | A | | 11/1973 | Karstedt |
| 3,814,730 | A | | 6/1974 | Karstedt |
| 3,878,263 | A | * | 4/1975 | Martin .................. C07F 7/1804 556/416 |
| 4,293,677 | A | | 10/1981 | Imai |
| 5,009,957 | A | | 4/1991 | Lee et al. |
| 5,017,654 | A | | 5/1991 | Togashi et al. |
| 5,624,977 | A | | 4/1997 | Takarada et al. |
| 5,789,334 | A | | 8/1998 | Nakanishi et al. |
| 9,227,183 | B2 | | 1/2016 | Sutoh et al. |
| 2003/0083454 | A1 | | 5/2003 | Marko et al. |
| 2010/0280266 | A1 | | 11/2010 | Larson et al. |

FOREIGN PATENT DOCUMENTS

| | | | | | |
|---|---|---|---|---|---|
| EP | 1235836 | B1 | | 7/2004 | |
| JP | S6040106 | A | * | 3/1985 | |
| KR | 20090072418 | A | * | 7/2009 | ............ C07F 7/1804 |
| WO | 2021113470 | A1 | | 6/2021 | |

OTHER PUBLICATIONS

Amgoune, A.; Krumova, M.; Mecking, S. Nanoparticle-Supported Molecular Polymerization Catalysts. Macromolecules 2008, 41 (22), 8388-8396.
Stöber, W.; Fink, A.; Bohn, E. Controlled Growth of Monodisperse Silica Spheres in the Micron Size Range. J. Colloid Interface Sci. 1968, 26, 62-69.
Miao, Q; Zheng-Ping, F; Cai, G., "Silica-supported Karstedt-type catalyst for hydrosilylation reactions", Catalysis Communications 4 (2003), 637-639.
Meister, T; Riener, K; Gigler, P; Stohrer, J; Herrmann, W; Kuhn, F., "Platinum Catalysis Revisited-Unraveling Principles of Catalytic Olefin Hydrosilylation", ACS Catal. 2016, 6, 2, 1274-1284.
Yang, H; Fang, Z.; Fu, X; Tong, L., "Preparation of glass fiber-supported platinum complex catalyst for hydrosilylation reactions", Catalysis Communications 9 (2008), 1092-1095.
Wang, D.; Klein, J.; Mejia, E. "Catalytic Systems for the Cross-Linking of Organosilicon Polymers" Chemistry—An Asian Journal 2017, 12, 1180-1197.
Troegel, D.; Stohrer, J. "Recent Advances and Actual Challenges in Late Transition Metal Catalyzed Hydrosilylation of Olefins from an Industrial Point of View" Coord. Chem. Rev. 2011, 255, 1440-1459.
Nakajima, Y.; Shimada, S. Hydrosilylation Reaction of Olefins: Recent Advances and Perspectives. RSC Adv. 2015, 5, 20603-20616.
Chu, W.-Y.; Gilbert-Wilson, R.; Rauchfuss, T. B.; van Gastel, M.; Neese, F., "Cobalt Phosphino-?-Iminopyridine-Catalyzed Hydrofunctionalization of Alkenes: Catalyst Development and Mechanistic Analysis" Organometallics 2016, 35, 2900-2914.
Ibrahim, A. D.; Entsminger, S. W.; Zhu, L.; Fout, A. R. "A Highly Chemoselective Cobalt Catalyst for the Hydrosilylation of Alkenes Using Tertiary Silanes and Hydrosiloxanes" ACS Catalysis 2016, 6, 3589-3593.
Hyatt, M. G.; Guironnet, D. "Silane as Chain Transfer Agent for the Polymerization of Ethylene Catalyzed by a Palladium(II) Diimine Catalyst" ACS Catalysis 2017, 7, 5717-5720.
Spencer, M. D.; Shelby, Q. D.; Girolami, G. S. "Titanium-Catalyzed Dehydrocoupling of Silanes: Direct Conversion of Primary Monosilanes to Titanium(0) Oligosilane Complexes with Agostica ?-Si—H···Ti Interactions" J. Am. Chem. Soc. 2007, 129, 1860-1861.

(Continued)

*Primary Examiner* — Vickey Nerangis
(74) *Attorney, Agent, or Firm* — Warner Norcross + Judd LLP

(57) ABSTRACT

A catalyst for hydrosilylation is provided. The catalyst comprises a nanoparticle having a surface and a plurality of ligands are tethered to the surface of the nanoparticle. Each ligand includes an independently selected cyclic aliphatic hydrocarbon group having one unsaturated moiety. Platinum is bonded to the unsaturated moiety the cyclic aliphatic hydrocarbon group in the catalyst. A method of preparing the catalyst is also provided. The method comprises mixing a ligand functionalized nanoparticle and a platinum mixture to give the catalyst.

15 Claims, 4 Drawing Sheets

(56) References Cited

OTHER PUBLICATIONS

Boardman, L. D., "(Cyclopentadienyl)trialkylplatinum Photohydrosilylation Catalysts. Mechanism of Active Catalyst Formation and Preparation of a Novel Bis(silyl)platinum hydride" Organometallics 1992, 11, 4194-4201.
Marchi, S.; Sangermano, M.; Meier, P.; Kornmann, X., "A Comparison of the Reactivity of Two Platinum Catalysts for Silicone Polymer Cross-Linking by UV-Activated Hydrosilation Reaction" Macromol. Reaction Eng. 2015, 9, 360-365.
De Vekki, D. A.; Skvortsov, N. K., "Hydrosilylation of Low-Molecular Siloxanes in the Presence of Photoactivated Alkene and Sulfoxide Platinum(II) Complexes" Russ. J. Gen. Chem. 2006, 76, 116-121.
Connelly, N. G.; Geiger, W. E., Chemical "Redox Agents for Organometallic Chemistry" Chem. Rev. 1996, 96, 877-910.
Boyer, J. L.; Cundari, T. R.; DeYonker, N. J.; Rauchfuss, T. B .; Wilson, S. R.f "Redox-Activation of Alkene Ligands in Platinum Complexes with Non-innocent Ligands" Inorg. Chem. 2009, 48, 638-645.
Bennett, M. A.; Heath, G. A.; Hockless, D. C. R.; Kovacok, I.; Willis, A. C, Alkene Complexes of Divalent and Trivalent Ruthenium Stabilized by Chelation. Dependence of Coordinated Alkene Orientation on Metal Oxidation State. J. Am. Chem. Soc. 1998, 120, 932-941.
Boucher-Jacobs, C; Rabnawaz, M.; Katz, J. S.; Even, R,; Guironnet, D. Encapsulation of Catalyst in Block Copolymer Micelles for the Polymerization of Ethylene in Aqueous Medium Nature Commun. 2018, 9, 841.
Wang, H.-C; Zhang, Y.; Possanza, C. M.; Zimmerman, S. C; Cheng, J.; Moore, J. S.; Harris, K.; Katz, J. S. "Trigger Chemistries for Better Industrial Formulations" ACS Appl. Mater. Interfaces 2015, 7, 6369-6382.
Esser-Kahn, A. P.; Odom, S. A.; Sottos, N. R.; White, S. R.; Moore, J. S. "Triggered Release from Polymer Capsules" Macromolecules 2011, 44, 5539-5553.
Andrade, B.; Song, Z.; Li, J.; Zimmerman, S. C; Cheng, J.; Moore, J. S.; Harris, K.; Katz, J. S. "New Frontiers for Encapsulation in the Chemical Industry" ACS Appl. Mater. Interfaces 2015, 7, 6359-6368.
Massard, A.; Rampazzi, V.; Perrier, A.; Bodio, E.; Picquet, M.; Richard, P.; Hierso, J.-C; Le Gendre, P., "(Cycloheptadienyl)diphenylphosphine; A Versatile Hybrid Ligand" Organometallics 2012, 31, 947-958.
Marko, I. E.; Sterin, S.; Bulsine, O.; Berthon, G.; Michaud, G.; Tinant, B.; Declercq, J.-P., "Highly Active and Selective Platinum(0)-Carbene Complexes. Efficient, Catalytic Hydrosilylation of Functionalized Olefins" Adv. Synth. Catal. 2004, 346,1429-1434.
Berthon-Gelloz, G.; Marko, I. E. "Efficient and Selective Hydrosilylation of Alkenes and Alkynes Catalyzed by Novel N-Heterocyclic Carbene PTO Complexes" in N-Heterocyclic Carbenes in Synthesis; S.P. Nolan (Ed.), Wiley-VCH, Weinheim, 2006, pp. 119-162.
Marko, I. E.; Sterin, S.; Bulsine, O.; Mignani, G.; Branlard, P.; Tinant, B.; Declercq, J.-P. "Selective and Efficient Platinum(0)-Carbene Complexes as Hydrosilylation Catalysts" Science 2002, 298, 204-206.
Miao, Qian Jiang, Zheng-Ping Fang, and Guo Ping Cai. "Silica-supported Karstedt-type catalyst for hydrosilylation reactions." Catalysis Communications 4.12 (2003): 637-639.

* cited by examiner

CATALYST, METHOD OF PREPARATION, AND METHODS INVOLVING HYDROSILYLATION

CROSS-REFERENCE TO RELATED APPLICATIONS

This application claims priority to and all advantages of U.S. Prov. Appl. No. 63/321,792 filed on 21 Mar. 2022, the content of which is incorporated herein by reference.

FIELD OF THE INVENTION

The present invention generally relates to a catalyst and, more specifically, to a catalyst for hydrosilylation and to a method for preparing the catalyst. The present invention also relates to compositions including the same and related methods.

BACKGROUND

Hydrosilylation reactions are generally known in the art and involve an addition reaction between silicon-bonded hydrogen and aliphatic unsaturation. Hydrosilylation reactions are utilized in various applications. For example, curable compositions often rely on hydrosilylation reactions for purposes of curing or crosslinking components thereof to give a cured product. Hydrosilylation reactions may also be utilized to prepare individual components or compounds, e.g. components for inclusion in curable compositions.

Hydrosilylation reactions are carried out in the presence of a catalyst, which is typically a platinum metal due to its excellent catalytic activity. Metal complexes can also be utilized to catalyze hydrosilylation reactions.

It is often desirable to selectively control catalytic activity of catalysts, particularly to extend shelf life and stability of curable compositions. For example, many conventional catalysts will initiate a hydrosilylation reaction at ambient conditions, including room temperature. There have been many attempts to selectively control catalytic activity of catalysts, such as by including hydrosilylation reaction inhibitors along with the catalyst, and by encapsulating catalysts with plastics that melt at elevated temperatures. However, conventional techniques to selectively control catalytic activity of catalysts have deficiencies. For example, incomplete encapsulation reduces shelf life and stability.

BRIEF SUMMARY

This disclosure provides a catalyst for hydrosilylation. The catalyst comprises a nanoparticle having a surface. A plurality of ligands are tethered to the surface of the nanoparticle. Each ligand independently has the following formula:

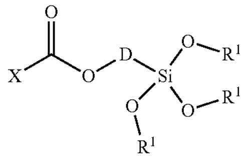

wherein each X is an independently selected cyclic aliphatic hydrocarbon group having one unsaturated moiety, each D is a divalent group, and each $R^1$ is independently selected from H, an alkyl group having from 1 to 8 carbon atoms, and a covalent bond to the surface of the nanoparticle. Platinum is bonded to the unsaturated moiety of X in the catalyst.

An encapsulated catalyst is also provided by this disclosure. The encapsulated catalyst comprises the catalyst and a thermoplastic polyolefin layer disposed about the catalyst.

This disclosure further provides a method of preparing the catalyst. The method comprises mixing a ligand functionalized nanoparticle and a platinum mixture to give the catalyst. The ligand functionalized nanoparticle comprises a plurality of ligands tethered to a surface of a nanoparticle, each ligand independently having the formula described above.

Further, this disclosure provides a composition. The composition comprises (A) an unsaturated compound including at least one aliphatically unsaturated group per molecule, subject to at least one of the following two provisos: (1) the unsaturated compound (A) also includes at least one silicon-bonded hydrogen atom per molecule; and/or (2) the composition further comprises (B) a silicon hydride compound including at least one silicon-bonded hydrogen atom per molecule. The composition further comprises the catalyst and/or the encapsulated catalyst.

A method of preparing a hydrosilylation reaction product is also provided. The method comprises reacting an aliphatically unsaturated group and a silicon-bonded hydrogen atom in the presence of the catalyst and/or the encapsulated catalyst to give the hydrosilylation reaction product. The aliphatically unsaturated group is present in the unsaturated compound (A), which is subject to the same provisos noted above in regards to the composition.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
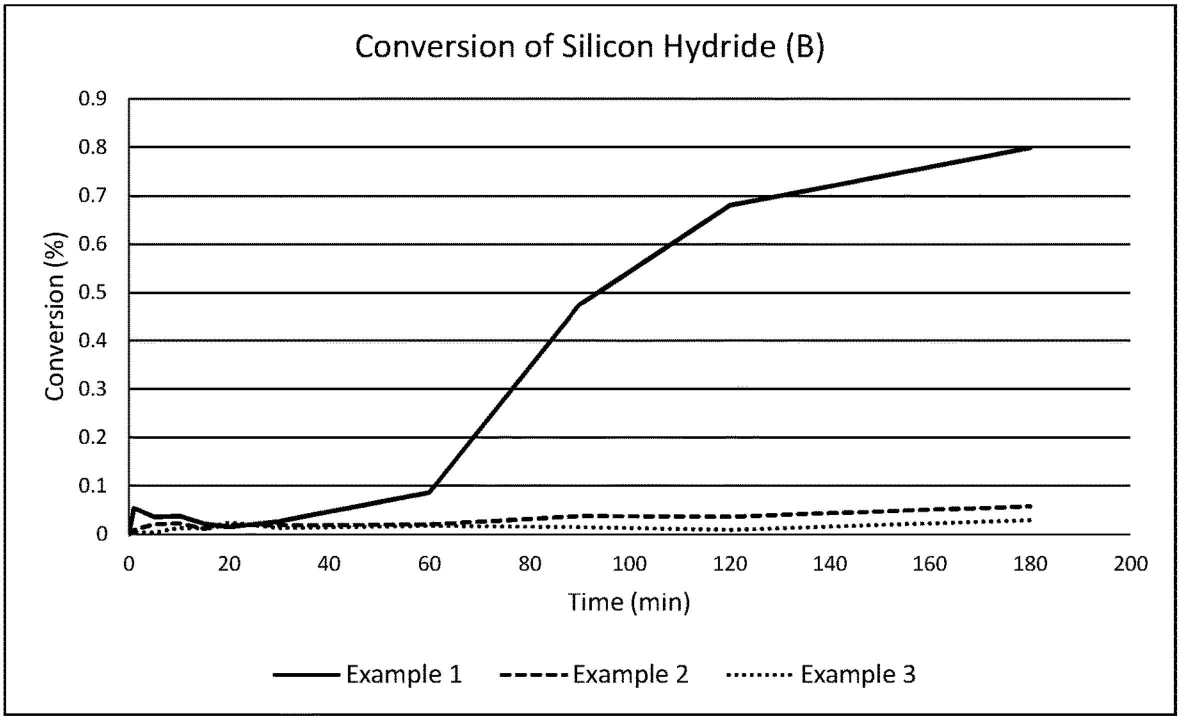
FIG. 1 shows hydrosilylation reaction kinetics for Example 1-3, plotting conversion of Silicon Hydride (B) as a function of time.

The present disclosure provides a catalyst. The catalyst has excellent physical properties and catalytic activity in hydrosilylation reactions. The catalyst has an exceptional shelf-life and longevity as compared to conventional catalysts for hydrosilylation, including conventional encapsulated catalysts.

The catalyst comprises a nanoparticle. The shape of the nanoparticle is not specifically restricted. For example, the nanoparticle may be spherical, rectangular, ovoid, irregular, and may be in the form of, for example, a powder, a flour, a fiber, a flake, a chip, a shaving, a strand, a scrim, a wafer, a wool, a straw, a particle, and combinations thereof. As understood in the art, the nanoparticle includes at least one dimension (in the x, y, or z plane coordinate) that is less than 100 nanometers (nm). In certain embodiments, each such dimension of the nanoparticle is less than 100 nm (in each of the x, y, and z directions). In specific embodiments, the nanoparticle is generally spherical, and the nanoparticle has a diameter that is less than 100 nm, e.g. from greater than 0 to less than 100, alternatively from 1 to 80, alternatively from 5 to 70, alternatively from 10 to 60, alternatively from 15 to 50, alternatively from 20 to 40, nm. Combinations of different nanoparticles may be utilized, which differ from one another in regards to type, shape, size, material, etc. Typically, the catalyst comprises a plurality of nanoparticles having an average diameter with the ranges described above.

Non-limiting examples of nanoparticles include those formed with, comprising, or consisting of quartz and/or crushed quartz, aluminum oxide, magnesium oxide, silica (e.g. fumed, ground, precipitated, or colloidal, e.g. as grown from the Stöber process), hydrated magnesium silicate, magnesium carbonate, dolomite, silicone resin, wollastonite, soapstone, kaolinite, kaolin, mica muscovite, phlogopite, halloysite (hydrated alumina silicate), aluminum silicate, sodium aluminosilicate, glass (fiber, beads or particles, including recycled glass, e.g. from wind turbines or other sources), clay, magnetite, hematite, calcium carbonate such as precipitated, fumed, and/or ground calcium carbonate, calcium sulfate, barium sulfate, calcium metasilicate, zinc oxide, talc, diatomaceous earth, iron oxide, clays, mica, chalk, titanium dioxide (titania), zirconia, sand, carbon black, graphite, anthracite, coal, lignite, charcoal, activated carbon, non-functional silicone resin, alumina, metal powders, magnesium oxide, magnesium hydroxide, magnesium oxysulfate fiber, aluminum trihydrate, aluminum oxyhydrate, carbon fibers, poly-aramids, nylon fibers, mineral fillers or pigments (e.g. titanium dioxide), non-hydrated, partially hydrated, or hydrated fluorides, chlorides, bromides, iodides, chromates, carbonates, hydroxides, phosphates, hydrogen phosphates, nitrates, oxides, and sulfates of sodium, potassium, magnesium, calcium, and barium; zinc oxide, antimony pentoxide, antimony trioxide, beryllium oxide, chromium oxide, lithopone, boric acid or a borate salt such as zinc borate, barium metaborate or aluminum borate, mixed metal oxides such as vermiculite, bentonite, pumice, perlite, fly ash, clay, and silica gel; rice hull ash, ceramic, zeolites, and combinations thereof.

Alternatively, the nanoparticle may comprise a silicone resin. For example, the nanoparticle may comprise an MQ silicone resin. As known in the art, M siloxy units are represented by $R^0{}_3SiO_{1/2}$, and Q siloxy units are represented by $SiO_{4/2}$, where $R^0$ is an independently selected substituent. Such non-reactive silicone resins are typically soluble in liquid hydrocarbons such as benzene, toluene, xylene, heptane and the like or in liquid organosilicon compounds such as a low viscosity cyclic and linear polydiorganosiloxanes. The molar ratio of M to Q siloxy units in the silicone resin may be from 0.5/1 to 1.5/1, alternatively from 0.6/1 to 0.9/1. These mole ratios can be conveniently measured by Silicon 29 Nuclear Magnetic Resonance Spectroscopy ($^{29}Si$ NMR). The silicone resin may further comprise 2.0 wt. % or less, alternatively 0.7 wt. % or less, alternatively 0.3 wt. % or less, of T units including a silicon-bonded hydroxyl or a hydrolyzable group, exemplified by alkoxy such as methoxy and ethoxy, and acetoxy, while still being within the scope of such silicone resins. The concentration of hydrolyzable groups present in the non-reactive silicone resin can be determined using Fourier Transform-Infrared (FT-IR) spectroscopy.

Alternatively or in addition, the nanoparticle may comprise a T resin, a TD resin, a TDM resin, a TDMQ resin, or any other silicone resin. Typically, such silicone resins include at least 30 mole percent T siloxy and/or Q siloxy units. As known in the art, D siloxy units are represented by $R^0{}_2SiO_{2/2}$, and T siloxy units are represented by $R^0SiO_{3/2}$, where $R^0$ is an independently selected substituent.

The weight average molecular weight, $M_W$, of the silicone resin will depend at least in part on the molecular weight of the silicone resin and the type(s) of substituents (e.g. hydrocarbyl groups) that are present in the silicone resin. $M_W$ as used herein represents the weight average molecular weight measured using conventional gel permeation chromatography (GPC), with narrow molecular weight distribution polystyrene (PS) standard calibration, when the peak representing the neopentamer is excluded from the measurement. The PS equivalent $M_W$ of the silicone resin may be from 12,000 to 30,000 g/mole, typically from 17,000 to 22,000 g/mole. The silicone resin can be prepared by any suitable method. Silicone resins of this type have been prepared by cohydrolysis of the corresponding silanes or by silica hydrosol capping methods generally known in the art.

In a specific embodiment, the nanoparticle comprises silica, such as fumed silica, silica aerogel, ground silica, silica xerogel, colloidal silica, or precipitated silica. Silica nanoparticles are known in the art and commercially available. Silica nanoparticles can also be synthesized via various techniques known in the art, such as the Stöber process, which results in colloidal silica.

The nanoparticle has a surface. In certain embodiments, the surface of the nanoparticle includes at least one SiOZ functional group, where each Z is independent H and an alkyl group having from 1 to 4 carbon atoms (i.e., where Z is methyl, ethyl, propyl, or butyl, such that the OZ functional groups are methoxy, ethoxy, propoxy, and/or butoxy). Typically, each Z is H such that the surface of the nanoparticle includes at least one silanol (SiOH) functional group. The nanoparticle may include a plurality of SiOZ functional groups, where each Z is independently selected. The SiOZ functional group is chemically and/or physically bonded to the surface of the nanoparticle.

A plurality of ligands are tethered to the surface of the nanoparticle. Each ligand independently has the following formula:

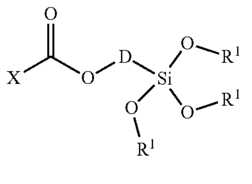

wherein each X is an independently selected bridged cyclic hydrocarbon group having one unsaturated moiety, each D is a divalent group, and each $R^1$ is independently selected from H, an alkyl group having from 1 to 8 carbon atoms, and a covalent bond to the surface of the nanoparticle. Platinum is bonded to the unsaturated moiety of X in the catalyst.

By "tethered," it is meant that the plurality of ligands are either physically connected or chemically bonded to the surface of the nanoparticle. Typically, the ligands are chemically bonded to the surface of the nanoparticle. In certain embodiments, at least one, alternatively at least two, alternatively all three of $R^1$ is a covalent bond, particularly when the ligands are chemically bonded to the surface of the nanoparticle. For example, the ligands are generally tethered to the surface of the nanoparticle via a condensation reaction with SiOZ functional groups described above, resulting in $R^1$ being a covalent bond to the surface of the nanoparticle. When $R^1$ is a covalent bond, $R^1$ is typically bonded to silicon at the surface of the nanoparticle, resulting in a siloxane (—Si—O—Si—) bond between the surface of the nanoparticle and the ligand at the point of attachment. It has been surprisingly found that the ligands do not perform as intended when not tethered to the surface of the nanoparticle.

When $R^1$ is an alkyl group, $R^1$ has from 1 to 8, alternatively from 1 to 7, alternatively from 1 to 6, alternately from 1 to 5, alternatively from 1 to 4, alternatively from 1 to 3, alternatively from 1 to 2, alternatively 1, carbon atoms.

As introduced above, D is a divalent group. The divalent group D is not particularly limited. Typically, the divalent group D is selected from divalent hydrocarbon groups. Examples of such hydrocarbon groups include divalent forms of hydrocarbyl and/or hydrocarbon groups. Typically, the divalent group D is a saturated hydrocarbon group, which may be linear and/or cyclic. In specific embodiments, the divalent group D is a linear saturated hydrocarbon group that is unsubstituted. The term "unsubstituted" describes hydrocarbon moieties composed of carbon and hydrogen atoms, i.e., without heteroatom substituents and without replacing hydrogen with atoms other than hydrogen.

In some embodiments, the divalent group D comprises, alternatively is a linear alkylene group. In certain embodiments, the divalent group D comprises, alternatively is, a $C_1$-$C_{18}$ hydrocarbon moiety, such as a linear hydrocarbon moiety having the formula $—(CH_2)_d—$, where subscript d is from 1 to 18. In some such embodiments, subscript d is from 1 to 16, such as from 1 to 12, alternatively from 1 to 10, alternatively from 1 to 8, alternatively from 1 to 6, alternatively from 2 to 6, alternatively from 2 to 4. In particular embodiments, subscript d is 3, such that the divalent group D comprises a propylene (i.e., a chain of 3 carbon atoms). As will be appreciated by those of skill in the art, each unit represented by subscript d is a methylene unit, such that linear hydrocarbon moiety may be defined or otherwise referred to as an alkylene group. In certain embodiments, the divalent group D comprises, alternatively is, an unsubstituted alkylene group.

X is an independently selected cyclic aliphatic hydrocarbon group having one unsaturated moiety. Each X may independently be monocyclic, bicyclic, or polycyclic. X is generally carbocyclic, i.e., all of the atoms in the cyclic moiety are carbon atoms. X may also or alternatively comprise a bridged cyclic moiety. The unsaturated moiety in X is generally a carbon-carbon double bond. One example of X is cyclohexene. Another specific example of X is norbornene. The number of carbon atoms in X is a function of whether X is monocyclic, bicyclic, or polycyclic. In certain embodiments, X has from 3 to 30, alternatively from 3 to 25, alternatively from 3 to 20, alternatively from 3 to 15, alternatively from 3 to 10, carbon atoms.

Platinum is bonded to the unsaturated moiety of X in the catalyst. Typically, the platinum in the catalyst has an oxidation state of 0. The platinum in the catalyst can be bonded to the unsaturated moiety of X in more than one ligand. For example, in certain embodiments, the catalyst comprises the following moiety:

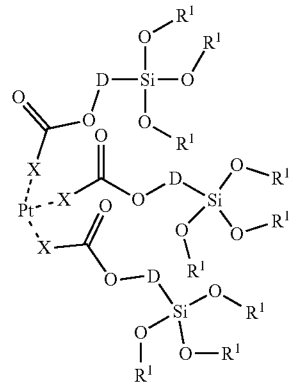

where each X, D, and $R^1$ is independently selected and defined above. In this moiety, there are three equivalents of X per equivalent of platinum.

In one specific embodiment, X is norbornene, and D is propylene, in at least one ligand, alternatively in all ligands.

The catalyst may optionally be disposed in a vehicle, e.g. a solvent which solubilizes the catalyst, alternatively a vehicle which merely carries or disperses, but does not solubilize, the catalyst. Such vehicles are known in the art.

Suitable vehicles include silicones, both linear and cyclic, organic oils, organic solvents and mixtures of these. For example, relative to silicones, the carrier vehicle may comprise a polydialkylsiloxane, e.g. polydimethylsiloxane.

The vehicle may also be a low viscosity organopolysiloxane or a volatile methyl siloxane or a volatile ethyl siloxane or a volatile methyl ethyl siloxane having a viscosity at 25° C. in the range of 1 to 1,000 $mm^2$/sec, such as hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

Alternatively, the vehicle may comprise an organic solvent. Examples of organic solvents include: aromatic hydrocarbons, such as benzene, toluene, xylene, mesitylene, etc.; aliphatic hydrocarbons, such as heptane, hexane, octane, etc.; glycol ethers, such as propylene glycol methyl ether, dipropylene glycol methyl ether, propylene glycol n-butyl ether, propylene glycol n-propyl ether, ethylene glycol n-butyl ether, etc.; halogenated hydrocarbons, such as dichloromethane, 1,1,1-trichloroethane, and chloroform; ketones, such as acetone, methylethyl ketone, or methyl isobutyl ketone; acetates, such as ethyl acetate, butyl acetate, ethylene glycol monoethyl ether acetate, and propylene glycol methyl ether acetate; alcohols, such as methanol, ethanol, isopropanol, butanol, or n-propanol; and others organic compounds that present as liquid/fluid at typical reaction temperatures, such as dimethyl sulfoxide, dimethyl formamide, acetonitrile, tetrahydrofuran, white spirits, mineral spirits, naphtha, n-methylpyrrolidone; and the like, as well as derivatives, modifications, and combination thereof.

In certain embodiments, the catalyst may be encapsulated and in the form of an encapsulated catalyst. The encapsulated catalyst comprises a thermoplastic polyolefin layer disposed about the catalyst. The thermoplastic polyolefin layer may be continuous or discontinuous relative to any dimension, including thickness. The encapsulated catalyst may not have the form of a core/shell encapsulated catalyst. Instead, more than one particle of the catalyst may be present in the same particle of the encapsulated catalyst, i.e., the encapsulated catalyst may comprise a blend of the catalyst in the thermoplastic polyolefin layer. The thermoplastic polyolefin layer may alternatively be referred to as a matrix for the catalyst therein.

The thermoplastic polyolefin layer is formed from a thermoplastic polyolefin, which is not particularly limited as long as the thermoplastic polyolefin does not inhibit the hydrosilylation catalytic activity of the catalyst. In specific embodiments, the thermoplastic polyolefin is selected from polyethylenes (PE), polypropylenes (PP), polybutylenes, poly (1-butene), polyisobutene, poly(l-pentene), poly(3-methyl-1-pentene), poly(4-methyl-1-hexene), poly(5-methyl-1-hexene), and combinations thereof.

In specific embodiments, the thermoplastic polyolefin comprises, alternatively is, polyethylene. The polyethylene may be selected from High Density Polyethylene (HDPE), Medium Density Polyethylene (MDPE), Low Density Polyethylene (LDPE), Linear Low Density Polyethylene (LLDPE), Very Low Density Polyethylene (VLDPE), Ultra Low Density Polyethylene (ULDPE), Low Density Low Molecular Weight Polyethylene (LDLMWPE) or a combination thereof.

In certain embodiments, the thermoplastic polyolefin comprises an ethylene-based polymer. In these embodiments, the ethylene-based polymer is an ethylene/α-olefin interpolymer, and further an ethylene/α-olefin copolymer. In one embodiment, the α-olefin has less than, or equal to, 20 carbon atoms. For example, the α-olefin comonomers may have 3 to 10 carbon atoms, and alternatively 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-butene, 1-hexene and 1-octene, and further 1-hexene and 1-octene.

A melting point temperature of the thermoplastic polyolefin is not particularly limited, but in certain embodiments, the thermoplastic polyolefin has a melting point temperature of less than 200° C., alternatively less than 150° C., alternatively less than 130° C. On the other hand, the melting point temperature of the thermoplastic polyolefin is typically at least 40° C., alternatively at least 60° C., alternatively at least 80, ° C. The melting point temperature can be measured with any known method. For example, the endothermic peak value resulting from melting at the time of measurement under heating conditions of 5° C./minute using a differential scanning calorimeter (DSC) is used as the melting point temperature.

The present invention further provides a method of preparing the catalyst. The method comprises mixing a ligand functionalized nanoparticle and a platinum mixture to give the catalyst. The ligand functionalized nanoparticle comprises a plurality of ligands tethered to a surface a nanoparticle, each ligand independently having the following formula:

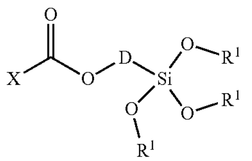

wherein each X, D, and $R^1$ is independently selected and defined above. The nanoparticle is also described above.

In certain embodiments, the platinum mixture comprises a platinum complex. In specific embodiments, the platinum mixture comprises a platinum(0) complex. In these or other embodiments, the platinum(0) complex is capable of being solvated in an organic solvent, i.e., capable of solubilizing, or at least partially solubilizing, in an organic solvent. Examples of suitable organic solvents are described above with respect to vehicles for the catalyst. One specific example of such a platinum(0) complex that is capable of being solvated in an organic solvent is Karstedt's catalyst, i.e., a platinum(0)-1,3-divinyl-1,1,3,3-tetramethyldisiloxane complex. In such embodiments, the platinum(0)-1,3-divinyl-1,1,3,3-tetramethyldisiloxane complex is typically solubilized in an organic solvent, often toluene.

Mixing the ligand functionalized nanoparticle and the platinum mixture typically results in ligand exchange when the platinum mixture comprises a platinum(0) complex, such as platinum(0)-1,3-divinyl-1,1,3,3-tetramethyldisiloxane complex, whereby the platinum of the platinum(0) complex binds to the unsaturated moiety of X of the ligand of the catalyst instead of the 1,3-divinyl-1,1,3,3-tetramethyldisiloxane compound in the platinum mixture. Such ligand exchange results in the catalyst.

In certain embodiments, the catalyst includes a molar ratio of X moieties in the ligands to platinum of from greater than 0 to 1,000 (X:Pt). The molar ratio of X moieties in the ligands to platinum in the catalyst generally influences catalytic vs. inhibitive properties of the catalyst at specific temperatures. As such, the molar ratio of X moieties in the ligands to platinum in the catalyst is generally selected based on end use applications of the catalyst, and desired parameters for using the catalyst in a hydrosilylation reaction, as described below. For example, when the molar ratio of X moieties in the ligands to platinum is less than 150 (X:Pt), the catalyst may catalyze a hydrosilylation reaction at room temperature. In contrast, when the molar ratio of X moieties in the ligands to platinum is greater than 350 (X:Pt), the catalyst may inhibit a hydrosilylation reaction at room temperature. In certain embodiments, it can be desirable to inhibit the hydrosilylation reaction at room temperature to improve shelf life and stability, with catalytic activity being triggered at elevated temperatures. For example, when the molar ratio of X moieties in the ligands to platinum is greater than 350 (X:Pt), the catalyst may inhibit a hydrosilylation reaction at room temperature, but readily catalyze a hydrosilylation reaction at an elevated temperature, e.g. 70° C. The latency and performance of the catalyst can also be further influenced or selectively controlled via encapsulation, as described below.

Mixing the ligand functionalized nanoparticle and the platinum mixture can be carried out via any suitable technique, optionally while modifying or selectively controlling ambient conditions, such as temperature, etc.

In certain embodiments, the method comprises preparing the ligand functionalized nanoparticle. The ligand functionalized nanoparticle can be prepared by combining an initial nanoparticle having a surface including at least one SiOZ functional group, where each Z is independently selected and defined above, and a plurality of ligand precursors independently having the following formula:

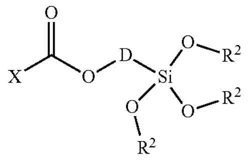

wherein each X and each D is independently selected and defined above, and each $R^2$ is independently selected from H and an alkyl group having from 1 to 8, alternatively from 1 to 6, alternatively from 1 to 4, alternatively from 1 to 3, alternatively 1 or 2, alternatively 1, carbon atoms. The ligand precursor typically tethers to the surface of the initial nanoparticle via a hydrolysis/and/or condensation reaction between the SiOZ functional group on the surface of the initial nanoparticle and the $Si(OR^2)_3$ moiety present in the ligand precursor. Thus, the ligand is the reaction product of the ligand precursor. When an $SiOR^2$ group in the ligand precursor reacts with the SiOZ functional group on the surface of the initial nanoparticle, the $SiOR^2$ group becomes an $SiOR^1$ group in the resulting catalyst, where $R^1$ is a covalent bond. $R^1$ can also be H or an alkyl group having from 1 to 8 carbon atoms for any $SiOR^2$ groups that do not react with an SiOZ functional group on the surface of the initial nanoparticle.

In certain embodiments, the initial nanoparticle is selected such that the SiOZ functional group is inherently present in or on the surface of the initial nanoparticle. By way of example, as understood in the art, silica nanoparticles generally include such SiOZ functional groups depending on their method of manufacture. In other embodiments, such SiOZ functional groups may be imparted by a surface treating agent. For example, the initial nanoparticle may have no surface functionality, but SiOZ functional groups can be formed on the initial nanoparticle via a surface treating agent. In these embodiments, the initial nanoparticle is not limited, and the SiOZ functional group may be formed via treating the initial nanoparticle with the surface treating agent.

The surface treating agent may comprise a silane such as an alkoxysilane, an alkoxy-functional oligosiloxane, a cyclic polyorganosiloxane, a hydroxyl-functional oligosiloxane such as a dimethyl siloxane or methyl phenyl siloxane, and/or an organosilicon compound. The surface treating agent may comprise a single surface treating agent, or a combination of two or more surface treating agents selected from similar or different types of molecules.

The surface treating agent may comprise an alkoxysilane, which may be a mono-alkoxysilane, a di-alkoxysilane, a tri-alkoxysilane, or a tetra-alkoxysilane. Alkoxysilane surface treating agents are exemplified by hexyltrimethoxysilane, octyltriethoxysilane, octyltrimethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof. In certain aspects the alkoxysilane(s) may be used in combination with silazanes, which catalyze the less reactive alkoxysilane reaction with surface hydroxyls. Such reactions are typically performed above 100° C. with high shear with the removal of volatile by-products such as ammonia, methanol and water.

Suitable surface treating agents also include alkoxysilyl functional alkylmethyl polysiloxanes, or similar materials where the hydrolyzable group may comprise, for example, silazane, acyloxy or oximo.

Alkoxy-functional oligosiloxanes can also be used as surface treating agents. Alkoxy-functional oligosiloxanes and methods for their preparation are generally known in the art. Other surface treating agents include mono-endcapped alkoxy functional polydiorganosiloxanes, i.e., polyorganosiloxanes having alkoxy functionality at one end.

If utilized, the relative amount of the surface treatment agent and the initial nanoparticle is selected based on the particular initial nanoparticle utilized as well as the selection of the surface treatment agent, and desired effect or properties thereof.

Combining the initial nanoparticle and the plurality of ligand precursors to prepare the ligand functionalized nanoparticles can be carried out via any suitable technique, optionally while modifying or selectively controlling ambient conditions, such as temperature, etc. In certain embodiments, the initial nanoparticle and the plurality of ligand precursors are combined in a vehicle, such as any of the vehicles described above. Generally, the initial nanoparticle and the plurality of ligand precursors are mixed in the vehicle, e.g. at room temperature, to prepare the ligand functionalized nanoparticle. No catalyst is required to prepare the ligand functionalized nanoparticles. However, if desired, a condensation catalyst can also be combined with the initial nanoparticle and the plurality of ligand precursors to accelerate the preparation of the ligand functionalized nanoparticle.

The condensation catalyst can be any condensation catalyst typically used to promote condensation of silicon-bonded hydroxy (silanol) groups to form Si—O—Si linkages. Examples of condensation catalysts include, but are not limited to, amines, complexes of metals (e.g. lead, tin, zinc, iron, titanium, zirconium) with organic ligands (e.g. carboxyl, hydrocarbyl, alkoxyl, etc.) In particular embodiments, the condensation catalyst can be selected from tin(II) and tin(IV) compounds such as tin dilaurate, tin dioctoate, dibutyltin dilaurate, dibutyltin diacetate, and tetrabutyl tin; and titanium compounds such as titanium tetrabutoxide. In these or other embodiments, the condensation catalyst may be selected from zinc-based, iron-based, and zirconium-based catalysts.

Preparation of the ligand functionalized nanoparticle can be monitored via gas chromatography, (GC), for example.

The relative amounts of the initial nanoparticle and the plurality of ligand precursors utilized to prepare the ligand functionalized nanoparticle are typically selected based on the initial nanoparticle utilized, the diameter or dimension of the initial nanoparticle, the selection of the plurality of ligand precursors, etc. In specific embodiments, the concentration of ligand precursors utilized is from greater than 0 to 30, alternatively from 1 to 20, alternatively from 5 to 15, alternatively from 7.5 to 12.5, alternatively from 9 to 11, micromole (μmol) of X in the ligand precursors per surface area of the initial nanoparticles in $m^2$.

In certain embodiments, the method further comprises preparing the ligand precursors. The ligand precursors can be prepared by reacting a cyclic diene compound and an organosilicon compound having the following formula:

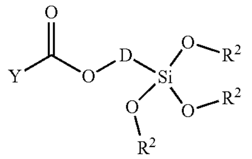

wherein each Y is an independently selected dienophilic group, and each D and each $R^2$ is independently selected and defined above.

The dienophilic group Y can be any moiety which renders the organosilicon compound a dienophile. As known in the art, the oxygen atoms of the organosilicon compound present between moieties Y and D influence the dienophilic nature of the organosilicon compound along with the selection of dienophilic group Y. Said differently, dienophilic group Y may not be dienophilic by itself without the overall moiety —COOY, with C being a carbon atom of D to which oxygen is bonded. In certain embodiments, Y comprises an unsaturated group, such as an alkenyl or alkynyl group having from 2 to 10, alternatively from 2 to 8, alternatively from 2 to 6, alternatively from 2 to 4, carbon atoms. Species of organosilicon compounds falling within the formula above are commercially available. For example, when Y is a vinyl group, each $R^2$ is methyl, and D is $C_3H_6$, the organosilicon compound is 3-(trimethoxysilyl)propyl acrylate.

The cyclic diene is selected based on the desired moiety X in the ligands of the catalyst. When X is norbornene, the cyclic diene compound utilized to prepare the ligand precursors is cyclopentadiene. Other examples of the cyclic diene include butadiene, 1,3-cyclohexadiene, etc. Such cyclic diene compounds are also known and commercially available.

The cyclic diene compound and the organosilicon compound are typically reacted in a 1:1 stoichiometric molar ratio. However, if desired, a molar excess of the cyclic diene compound, or a molar excess of the organosilicon compound, may be utilized. In certain embodiments, the cyclic diene compound and the organosilicon compound are reacted in a vehicle, typically an organic solvent. Specific examples of suitable organic solvents are disclosed above. In a specific embodiment, the cyclic diene compound and the organosilicon compound are reacted at a reflux temperature of the vehicle, or at an elevated temperature.

As described above, this disclosure also provides an encapsulated catalyst. When the catalyst is encapsulated, the method further comprises encapsulating the catalyst in a thermoplastic polyolefin to give the encapsulated catalyst.

The method utilized to prepare the encapsulated catalyst by encapsulating the catalyst with the thermoplastic polyolefin is not particularly limited. Methods of encapsulation are generally known in the art. For example, the encapsulated catalyst can be prepared via a chemical method, such as an interfacial polymerization method or an in-situ polymerization method; a physicochemical method, such as a coacervation method or a liquid drying method; or a physical/mechanical method such as a spray drying method. In a specific embodiment, the encapsulated catalyst is prepared via a nanoprecipitation method.

In the nanoprecipitation method, the ligand functionalized nanoparticle, platinum mixture, and thermoplastic polyolefin are combined to give a mixture and mixed, typically in a vehicle, such as any of the organic solvents disclosed above. The ligand functionalized nanoparticle, platinum mixture, and thermoplastic polyolefin are generally mixed at an elevated temperature to melt the thermoplastic polyolefin in the mixture. The ligand functionalized nanoparticle and the platinum mixture result in formation of the catalyst in situ in the mixture. The mixture can then be added dropwise into a liquid having a temperature less than the melting point temperature of the thermoplastic polyolefin, e.g. room temperature, causing immediate precipitation of the mixture in the form of the encapsulated catalyst. One of skill in the art understands how to control average particle size of the encapsulated catalyst in such nanoprecipitation methods. The liquid in which the mixture is precipitated is typically an organic solvent. The resulting encapsulated catalyst can then be isolated, e.g. via centrifugation.

As introduced above, the present invention also provides a composition. The composition comprises (A) an unsaturated compound. The unsaturated compound (A) includes at least one aliphatically unsaturated group per molecule, which may alternatively be referred to as ethylenic unsaturation. The unsaturated compound (A) is not limited and may be any unsaturated compound having at least one aliphatically unsaturated group. In certain embodiments, the unsaturated compound (A) comprises an organic compound. In other embodiments, the unsaturated compound (A) comprises a siloxane. In yet other embodiments, the unsaturated compound (A) comprises a silicone-organic hybrid, or an organosilicon compound. Various embodiments and examples of the unsaturated compound (A) are disclosed below.

In certain embodiments, the unsaturated compound (A) includes an average of at least two aliphatically unsaturated groups per molecule. In such embodiments, the unsaturated compound (A) is capable of polymerization or curing beyond single cure-site hydrosilylation. The aliphatically unsaturated groups of the unsaturated compound (A) may be terminal, pendent, or in both locations in the unsaturated compound (A).

For example, the aliphatically unsaturated group may be an alkenyl group and/or an alkynyl group. "Alkenyl group" means an acyclic, branched or unbranched, monovalent hydrocarbon group having one or more carbon-carbon double bonds. The alkenyl group may have from 2 to 30 carbon atoms, alternatively from 2 to 24 carbon atoms, alternatively from 2 to 20 carbon atoms, alternatively from 2 to 12 carbon atoms, alternatively from 2 to 10 carbon atoms, alternatively from 2 to 6 carbon atoms. Alkenyl groups are exemplified by, but not limited to, vinyl, allyl, propenyl, and hexenyl. "Alkynyl group" means an acyclic, branched or unbranched, monovalent hydrocarbon group having one or more carbon-carbon triple bonds. The alkynyl group may have from 2 to 30 carbon atoms, alternatively from 2 to 24 carbon atoms, alternatively from 2 to 20 carbon atoms, alternatively from 2 to 12 carbon atoms, alternatively from 2 to 10 carbon atoms, alternatively from 2 to 6 carbon atoms. Alkynyl is exemplified by, but not limited to, ethynyl, propynyl, and butynyl.

In specific embodiments, the unsaturated compound (A) has the formula $R^4$—Z—$R^4$, where Z is a divalent linking group, which may be a divalent hydrocarbon, a polyoxyalkylene, a polyalkylene, a polyisoalkylene, a hydrocarbon-silicone copolymer, a siloxane, or mixtures (in block or randomized form) thereof. Z may be linear or branched. In these specific embodiments, $R^4$ is independently selected and includes aliphatic unsaturation, i.e., each $R^4$ is independently selected from alkenyl groups and alkynyl groups. However, the aliphatic unsaturation need not be terminal in the unsaturated compound (A).

In these specific embodiments, the unsaturated compound (A) includes two aliphatically unsaturated groups represented by $R^2$.

In one embodiment of the unsaturated compound (A), Z is a divalent hydrocarbon. The divalent hydrocarbon Z may contain 1 to 30 carbons, either as aliphatic or aromatic structures, and may be branched or unbranched. Alternatively, the linking group Z may be an alkylene group containing 1 to 12 carbons. In these embodiments, the unsaturated compound (A) may be selected from α, ω-unsaturated hydrocarbons. The α, ω-unsaturated hydrocarbons may alternatively be referred to as olefins.

For example, the unsaturated compound (A) may be any diene, diyne or ene-yne compound. With reference to the formula above, in these embodiments, $R^4$ may be, for example, independently selected from $CH_2{=}CH-$, $CH_2{=}CHCH_2-$, $CH_2{=}CH(CH_2)_4-$, $CH_2{=}C(CH_3)CH_2-$ or and similar substituted unsaturated groups such as $H_2C{=}C(CH_3)-$, and $HC{=}C(CH_3)-$. In such embodiments, the unsaturated compound (A) may be referred to as an α,ω-unsaturated hydrocarbon. The α,ω-unsaturated hydrocarbon may be, for example, an α,ω-diene of the formula $CH_2{=}CH(CH_2)_bCH{=}CH_2$, an α,ω-diyne of the formula $CH{\equiv}C(CH_2)_bC{\equiv}CH$, an α,ω-ene-yne of the formula $CH_2{=}CH(CH_2)_bC{\equiv}CH$, or mixtures thereof, where b is independently from 0 to 20, alternatively from 1 to 20.

Specific examples of suitable diene, diyne or ene-yne compounds include 1,4-pentadiene, 1,5-hexadiene; 1,6-heptadiene; 1,7-octadiene, 1,8-nonadiene, 1,9-decadiene, 1,11-dodecadiene, 1,13-tetradecadiene, and 1,19-eicosadiene, 1,3-butadiyne, 1,5-hexadiyne (dipropargyl), and 1-hexene-5-yne.

However, the unsaturated compound (A) may alternatively have the formula $R^4$—Z', where $R^4$ is defined above and Z' is a monovalent hydrocarbon group (or silyl or siloxane group). In these specific embodiments, the unsaturated compound (A) includes one aliphatically unsaturated group represented by $R^4$.

When the unsaturated compound (A) includes only one aliphatically unsaturated group, the unsaturated compound (A) may be referred to as an unsaturated hydrocarbon, and may be any -ene or -yne compound. In such embodiments, the unsaturated compound (A) may be an acyclic alkene and/or an acyclic alkyne. However, the unsaturated compound (A) may include aryl groups so long as the unsaturated compound (A) also includes the at least one aliphatically unsaturated group independent from any aryl groups, e.g. pendent therefrom.

In another embodiment, the unsaturated compound (A) comprises, alternatively is, a polyether. In these embodiments, the unsaturated compound (A) comprises a polyoxyalkylene group having the formula $(C_aH_{2a}O)$, wherein a is from 2 to 4 inclusive. With reference to the general formula above, Z' is the polyoxyalkylene group. In these embodiments, the unsaturated compound (A) may be referred to as the polyoxyalkylene.

The polyoxyalkylene may comprise oxyethylene units $(C_2H_4O)$, oxypropylene units $(C_3H_6O)$, oxybutylene or oxytetramethylene units $(C_4H_8O)$, or mixtures thereof, which may be in block form or randomized in the unsaturated compound (A).

For example, the unsaturated compound (A) as the polyoxyalkylene may have the following general formula:

$$R^4O-[(C_2H_4O)_c(C_3H_6O)_d(C_4H_8O)_e]-R^4$$

wherein each $R^4$ is independently selected and defined above; c is from 0 to 200, d is from 0 to 200, and e is from 0 to 200, with the proviso that c, d and e are not simultaneously 0. In specific embodiments, c is from 0 to 50, alternatively from 0 to 10, alternatively from 0 to 2. In these or other embodiments, d is from 0 to 100, alternatively 1 to 100, alternatively 5 to 50. In these or other embodiments, e is from 0 to 100, alternatively 0 to 50, alternatively 0 to 30. In various embodiments, the ratio of (d+e)/(c+d+e) is greater than 0.5, alternatively greater than 0.8, or alternatively greater than 0.95.

This polyoxyalkylene is terminated at each molecular chain end (i.e. alpha and omega positions) with $R^4$, which is independently selected and described above. Additional examples of $R^2$ include $H_2C{=}C(CH_3)CH_2-$ $H_2C{=}CHCH_2CH_2-$, $H_2C{=}CHCH_2CH_2CH_2-$, and $H_2C{=}CHCH_2CH_2CH_2CH_2-$, $HC{\equiv}C-$, $HC{\equiv}CCH_2-$, $HC{\equiv}CCH(CH_3)-$, $HC{\equiv}CC(CH_3)_2-$, $HC{\equiv}CC(CH_3)_2CH_2-$. However, the polyoxyalkylene set forth above is merely one exemplary example of a suitable polyoxyalkylene.

In specific embodiments, the polyoxyalkylene group comprises only oxypropylene units $(C_3H_6O)$. Representative, non-limiting examples of polyoxypropylene-containing polyoxyalkylenes include: $H_2C{=}CHCH_2[C_3H_6O]_dCH_2CH{=}CH_2$, $H_2C{=}CH[C_3H_6O]_dCH{=}CH_2$, $H_2C{=}C(CH_3)CH_2[C_3H_6O]_dCH_2C(CH_3){=}CH_2$, $HC{\equiv}CCH_2[C_3H_6O]_dCH_2C{\equiv}CH$, and $HC{\equiv}CC(CH_3)_2[C_3H_6O]_dC(CH_3)_2C{\equiv}CH$, where d is as defined above.

Representative, non-limiting examples of polyoxybutylene or poly(oxytetramethylene) containing polyoxyalkylenes include: $H_2C{=}CHCH_2[C_4H_8O]_eCH_2CH{=}CH_2$, $H_2C{=}CH[C_4H_8O]_eCH{=}CH_2$, $H_2C{=}C(CH_3)CH_2[C_4H_8O]_eCH_2C(CH_3){=}CH_2$, $HC{\equiv}CCH_2[C_4H_8O]_eCH_2C{\equiv}CH$, and $HC{\equiv}CC(CH_3)_2[C_4H_8O]_eC(CH_3)_2C{\equiv}CH$, where e is as defined above.

The examples of polyoxyalkylenes suitable for (A) the unsaturated compound include two aliphatically unsaturated groups. However, the polyoxyalkylene suitable for (A) the unsaturated compound may include only one aliphatically unsaturated group. For example, the polyoxyalkylene suitable for (A) the unsaturated compound may alternatively have the following general formula:

$$R^4O-[(C_2H_4O)_c(C_3H_6O)_d(C_4H_8O)_e]-R^5$$

where $R^4$, c, d, and e are defined above, and $R^5$ is H or an alkyl group, such as $CH_3$. Any description or examples above also apply to this embodiment as well. One of skill in the art readily understands how the examples of polyoxyalkylenes above with two aliphatically unsaturated groups may alternatively include but one aliphatically unsaturated group.

The polyoxyalkylene may be prepared by, for example, the polymerization of ethylene oxide, propylene oxide, butylene oxide, 1,2-epoxyhexane, 1,2-epoxyoctance, and/or cyclic epoxides, such as cyclohexene oxide or exo-2,3-epoxynorborane. The polyoxyalkylene moiety of the polyoxyalkylene may comprise oxyethylene units $(C_2H_4O)$, oxypropylene units $(C_3H_6O)$, oxybutylene units $(C_4H_8O)$, or mixtures thereof. Typically, the polyoxyalkylene group comprises a majority of oxypropylene or oxybutylene units, as defined on a molar basis and indicated in the above formula by the c, d, and e subscripts.

In another embodiment, Z of the general formula $R^4$—Z—$R^4$ or Z' or the formula $R^4$—Z' of the unsaturated compound (A) comprises a polyalkylene group. The polyalkylene group may comprise from $C_2$ to $C_6$ alkylene units or their isomers. One specific example is polyisobutylene group, which is a polymer including isobutylene units. For example, the unsaturated compound (A) may be a di-allyl terminated polyisobutylene or an allyl-terminated polyisobutylene. The molecular weight of the polyisobutylene group may vary, but typically ranges from 100 to 10,000 g/mole.

In certain embodiments, the unsaturated compound (A) comprises an organopolysiloxane. The organopolysiloxane is not limited and may be any organopolysiloxane including at least one silicon-bonded aliphatically unsaturated group per molecule. For example, the organopolysiloxane may be linear, branched, partly branched, cyclic, resinous (i.e., have a three-dimensional network), or may comprise a combination of different structures. When the unsaturated compound (A) comprises the organopolysiloxane, the aliphatically unsaturated group is silicon-bonded (e.g. as silicon-bonded alkenyl and/or silicon-bonded alkynyl).

In certain embodiments when the unsaturated compound (A) comprises an organopolysiloxane, the organopolysiloxane has the following average formula:

$$R^6_fSiO_{(4-f)/2}$$

wherein each $R^6$ is an independently selected substituted or unsubstituted hydrocarbyl group with the proviso that in each molecule, at least one, alternatively at least two, $R^6$ groups is an aliphatically unsaturated group, and wherein f is selected such that $0<f\leq3.2$.

The average formula above for the organopolysiloxane may be alternatively written as $(R^6_3SiO_{1/2})_w(R^6_2SiO_{2/2})_x(R^6SiO_{3/2})_y(SiO_{4/2})_z$, where $R^6$ and its proviso is defined above, and w, x, y, and z are independently from to $\geq0$ to $\leq1$, with the proviso that w+x+y+z=1. One of skill in the art understands how such M, D, T, and Q units and their molar fractions influence subscript fin the average formula above. T and Q units, indicated by subscripts y and z, are typically present in silicone resins, whereas D units, indicated by subscript x, are typically present in silicone polymers (and may also be present in silicone resins).

Each $R^6$ is independently selected, as introduced above, and may be linear, branched, cyclic, or combinations thereof. In general, hydrocarbyl groups suitable for $R^6$ may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, hexadecyl, octadecyl, as well as branched saturated hydrocarbon groups having from 6 to 18 carbon atoms. Examples of suitable non-conjugated cyclic groups include cyclobutyl, cyclohexyl, and cycyloheptyl groups. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, hexadecenyl, octadecenyl and cyclohexenyl groups. Examples of suitable monovalent halogenated hydrocarbon groups (i.e., halocarbon groups, or substituted hydrocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups.

In certain embodiments, the organopolysiloxane is substantially linear, alternatively is linear. By substantially linear, it is meant that the organopolysiloxane can include at least some branching attributable to T or Q, typically T, siloxy units, so long as at least 90, alternatively at least 95, mol % of siloxy units are D siloxy units. In these embodiments, the substantially linear organopolysiloxane may have the average formula:

$$R^6_{f'}SiO_{(4-f')/2}$$

wherein each $R^6$ and its proviso are defined above, and wherein f' is selected such that $1.9\leq f'\leq2.2$.

In these embodiments, at a temperature of 25° C., the substantially linear organopolysiloxane is typically a flowable liquid or is in the form of an uncured rubber. Generally, the substantially linear organopolysiloxane has a viscosity of from 10 to 30,000,000 mPa·s, alternatively from 10 to 10,000 mPa·s, alternatively from 100 to 1,000,000 mPa·s, alternatively from 100 to 100,000 mPa·s, at 25° C. Viscosity may be measured at 25° C. via a Brookfield LV DV-E viscometer, as understood in the art.

In specific embodiments in which the organopolysiloxane is substantially linear or linear, the organopolysiloxane may have the average formula:

$$(R^6_3SiO_{1/2})_{m'}(R^6_2SiO_{2/2})_{n'}(R^6SiO_{3/2})_o,$$

wherein each $R^6$ is independently selected and defined above (including the proviso that in each molecule, at least one $R^6$ is an aliphatically unsaturated group), and $m'\geq2$, $n'\geq1$, and $o\geq0$. In specific embodiments, subscript m' is from 2 to 10, alternatively from 2 to 8, alternatively from 2 to 6. In these or other embodiments, subscript n' is from 1 to 1,000, alternatively from 1 to 500, alternatively from 1 to 200. In these or other embodiments, subscript o is from 0 to 10, alternatively from 0 to 5, alternatively from 0 to 2. As understood in the art, when subscript o is 0, the organopolysiloxane is linear.

When the organopolysiloxane is substantially linear, alternatively is linear, the silicon-bonded aliphatically unsaturated group(s) may be pendent, terminal or in both pendent and terminal locations. As a specific example of the organopolysiloxane having pendant silicon-bonded aliphatically unsaturated groups, the organopolysiloxane may have the average formula:

$$(CH_3)_3SiO[(CH_3)_2SiO]_{n'}[(CH_3)ViSiO]_{m'}Si(CH_3)_3$$

where n' and m' are defined above, and Vi indicates a vinyl group. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Alternatively, as a specific example of the organopolysiloxane having terminal silicon-bonded aliphatically unsaturated groups, the organopolysiloxane may have the average formula:

$$Vi(CH_3)_2SiO[(CH_3)_2SiO]_{n'}Si(CH_3)_2Vi$$

where n' and Vi are defined above. The dimethyl polysiloxane terminated with silicon-bonded vinyl groups may be utilized alone or in combination with the dimethyl, methylvinyl polysiloxane disclosed immediately above. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Because the at least two silicon-bonded aliphatically unsaturated groups may be both pendent and terminal, the (A) organopolysiloxane may have the average formula:

$$Vi(CH_3)_2SiO[(CH_3)_2SiO]_{n'}[(CH_3)ViSiO]_{m'}SiVi(CH_3)_2$$

where n', m' and Vi are defined above.

The substantially linear organopolysiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

In these or other embodiments, the (A) organopolysiloxane may be a resinous organopolysiloxane. In these embodiments, the resinous organopolysiloxane may have the average formula:

$$R^6_{f''}SiO_{(4-f'')/2}$$

wherein each $R^6$ and its provisos are defined above, and wherein f" is selected such that 0.5≤f"≤1.7.

The resinous organopolysiloxane has a branched or a three dimensional network molecular structure. At 25° C., the resinous organopolysiloxane may be in a liquid or in a solid form, optionally dispersed in a carrier, which may solubilize and/or disperse the resinous organopolysiloxane therein.

In specific embodiments, the resinous organopolysiloxane may be exemplified by an organopolysiloxane that comprises only T units, an organopolysiloxane that comprises T units in combination with other siloxy units (e.g. M, D, and/or Q siloxy units), or an organopolysiloxane comprising Q units in combination with other siloxy units (i.e., M, D, and/or T siloxy units). The resinous organopolysiloxane comprises T and/or Q units. A specific example of the resinous organopolysiloxane is a vinyl functional silsesquioxane, or a vinyl functional MQ resin.

The organopolysiloxane may comprise a combination or mixture of different organopolysiloxanes, including those of different structures.

Alternatively, the unsaturated compound (A) may be a silicone-organic hybrid. For example, the unsaturated compound (A) may comprise the hydrosilylation reaction product of organopolysiloxanes (or of one or more organopolysiloxanes with one or more organic compounds), in which case the backbone of the unsaturated compound (A) may include organic divalent linking groups. As another example, organohydrogensiloxanes may be reacted with other organopolysiloxanes, or with organic compounds, to give the unsaturated compound (A).

For example, the unsaturated compound (A) may be the reaction product of (a1) at least one Si—H compound and (b1) at least one compound having ethylenic unsaturation. In these embodiments, a molar excess of ethylenic unsaturated groups of the (b1) compound are utilized as compared to Si—H groups of the (a1) Si—H compound such that the unsaturated compound (A) includes at least one, alternatively an average of at least two, silicon-bonded aliphatically unsaturated groups.

The reaction product of the (a1) Si—H compound and the (b1) compound having ethylenic unsaturation may be referred to as an (AB)n type copolymer, with the (a1) Si—H compound forming units A and the (b1) compound having ethylenic unsaturation forming units B. Combinations of different (a1) Si—H compounds may be utilized, and combinations of different (b1) compounds having ethylenic unsaturation may be utilized, such that the resulting (b) crosslinking agent comprises distinct units but may not be an (AB)n type copolymer. The distinct units may be randomized or in block form.

Alternatively still, the unsaturated compound (A) may comprise an organosilicon-compound, but not an organopolysiloxane. For example, the unsaturated compound (A) may comprise a silane, a disilane, or a siloxane (for example a disiloxane), while not constituting an organopolysiloxane.

One example of a suitable silane is that of formula $R^7_{z''}SiR^8_{4-z''}$, where each $R^7$ independently is an aliphatically unsaturated group, each $R^8$ is independently a substituted or unsubstituted hydrocarbyl group, and 1≤z"≤4. One example of a siloxane is tetramethyldivinyldisiloxane. One of skill in the art understands how to prepare or obtain such compounds for use as the unsaturated compound (A).

The unsaturated compound (A) can be a single unsaturated compound or a combination comprising two or more different silicon hydride compounds.

The composition and unsaturated compound (A) are subject to at least one of the following two provisos: (1) the unsaturated compound (A) also includes at least one silicon-bonded hydrogen atom per molecule; and/or (2) the composition further comprises (B) a silicon hydride compound including at least one silicon-bonded hydrogen atom per molecule.

In a first embodiment, the proviso (1) is true such that the unsaturated compound (A) also includes at least one silicon-bonded hydrogen atom per molecule. In a second embodiment, the proviso (2) is true such that the composition further comprises (B) a silicon hydride compound including at least one silicon-bonded hydrogen atom per molecule. Finally, in a third embodiment, both proviso (1) and proviso (2) are true such that the unsaturated compound (A) also includes at least one silicon-bonded hydrogen atom per molecule, and that the composition further comprises (B) a silicon hydride compound including at least one silicon-bonded hydrogen atom per molecule.

In the first embodiment, the proviso (1) is true and the unsaturated compound (A) includes at least one silicon-bonded hydrogen atom per molecule in addition to the aliphatically unsaturated group. In these embodiments, the unsaturated compound (A) may be any compound including at least one silicon-bonded hydrogen atom and at least one aliphatically unsaturated group. In these embodiments, the unsaturated compound (A) is typically an organosilicon compound and/or an organopolysiloxane.

One of skill in the art readily understands how to prepare or obtain such unsaturated compounds. For example, organosilicon compounds including both aliphatic unsaturated and silicon-bonded hydrogen may be prepared from the unsaturated organic compounds disclosed above. As but one example, an α,ω-diene of the formula $CH_2{=}CH(CH_2)_bCH{=}CH_2$ may be reacted with a silane of formula $H_2Si(CH_3)_2$ in the presence of a hydrosilylation catalyst to give an unsaturated compound of formula $CH_2{=}CH(CH_2)_bCH_2CH_2Si(CH_3)_2H$, which includes one aliphatically unsaturated group and one silicon-bonded hydrogen atom. The organosilicon compound may also be a silane, disilane, siloxane, etc. For example, the organosilicon compound may be of formula $R^7_{b'}H_{c'}SiR^8_{4-b'-c'}$, where $R^7$ and $R^8$ are independently selected and defined above, b' is 1, 2, or 3, c' is 1, 2, or 3, with the proviso that $2 \leq (b'+c') \leq 4$.

When the unsaturated compound (A) comprises the organopolysiloxane having both aliphatic unsaturation and silicon-bonded hydrogen, the organopolysiloxane may have the formula $R^6_{d'}H_{e'}SiO_{(4-d'-e')/2}$, where $R^6$ is independently selected and defined above (still subject to the proviso that at least one $R^6$ is the aliphatically unsaturated group), and e' and f' are each greater than 0 such that $0<(d'+e') \leq 3.2$.

Alternatively, when the unsaturated compound (A) comprises the organopolysiloxane having both aliphatic unsaturation and silicon-bonded hydrogen, the silicon-bonded aliphatically unsaturated group(s) and the silicon-bonded hydrogen atom(s) may be present in any M, D, and/or T siloxy unit present in the organopolysiloxane, and may be bonded to the same silicon atom (in the case of M and/or D siloxy units). The organopolysiloxane may comprise, for example, as M siloxy units: $(R^6_3SiO_{1/2})$, $(R^6_2HSiO_{1/2})$, $(R^6H_2SiO_{1/2})$, and/or $(H_3SiO_{1/2})$. The organopolysiloxane may comprise, for example, as D siloxy units: $(R^6_2SiO_{2/2})$, $(R^6HSiO_{2/2})$, and/or $(H_2SiO_{2/2})$. The organopolysiloxane may comprise, for example, as T siloxy units: $(R^6SiO_{3/2})$ and/or $(HSiO_{3/2})$. Such siloxy units may be combined in any manner, optionally along with Q siloxy units, to give an organopolysiloxane having at least one silicon-bonded aliphatically unsaturated group designated by $R^6$ and at least one silicon-bonded hydrogen atom.

For example, the organopolysiloxane may have any one of the following formulas: $(R^6_2HSiO_{1/2})_{w'}(R^6_2SiO_{2/2})_{x'}(R^6SiO_{3/2})_{y'}(SiO_{4/2})_{z'}$, $(R^6H_2SiO_{1/2})_{w'}(R^6_2SiO_{2/2})_{x'}(R^6SiO_{3/2})_{y'}(SiO_{4/2})_{z'}$, $(R^6_3SiO_{1/2})_{w'}(R^6HSiO_{2/2})_{x'}(R^6SiO_{3/2})_{y'}(SiO_{4/2})_{z'}$, $(R^6H_2SiO_{1/2})_{w'}(R^6HSiO_{2/2})_{x'}(R^6SiO_{3/2})_{y'}(SiO_{4/2})_{z'}$, $(R^6_3SiO_{1/2})_{w'}(R^6_2SiO_{2/2})_{x'}(HSiO_{3/2})_{y'}(SiO_{4/2})_{z'}$, $(R^6_3SiO_{1/2})_{w'}(R^6HSiO_{2/2})_{x'}(R^6SiO_{3/2})_{y'}(SiO_{4/2})_{z'}$, and/or $(R^6H_2SiO_{1/2})_{w'}(R^6HSiO_{2/2})_{x'}(HSiO_{3/2})_{y'}(SiO_{4/2})_{z'}$, etc., where each $R^6$ is independently selected and defined above (with at least one $R^6$ being an aliphatically unsaturated group), and w', x', y', and z' are independently from ≥0 to ≤1, with the proviso that w'+x'+y'+z"=1.

In the second embodiment, the proviso (2) is true and the composition further comprises (B) a silicon hydride compound including at least one silicon-bonded hydrogen atom per molecule.

In these embodiments, the silicon hydride compound (B) may be any compound including at least one silicon-bonded hydrogen atom. Depending on a structure of the silicon hydride compound (B), the silicon hydride compound (B) may be a silane compound, an organosilicon compound, an organohydrogensilane, an organohydrogensiloxane, etc.

The silicon hydride compound (B) can be linear, branched, cyclic, resinous, or have a combination of such structures. In acyclic polysilanes and polysiloxanes, the silicon-bonded hydrogen atom(s) can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms.

In certain embodiments, the silicon hydride compound (B) is of formula $R^9_{4-s}SiH_s$, where $R^9$ is independently selected and may be any silicon-bonded group, and s is selected such that $1 \leq s \leq 4$. Typically, s is 1, 2, or 3, alternatively 1 or 2. Each $R^9$ is typically independently a substituted or unsubstituted hydrocarbyl group, suitable examples of which are described above. However, $R^9$ can be any silicon-bonded group so long as the silicon hydride (B) is still capable of undergoing hydrosilylation via its silicon-bonded hydrogen atom. For example, $R^9$ can be a halogen. When the silicon hydride (B) is a silane compound, the silicon hydride (B) can be a monosilane, disilane, trisilane, or polysilane.

In these or other embodiments, the silicon hydride compound (B) may be an organosilicon compound of formula: $H_{g'}R^{10}_{3-g'}Si{-}R^{11}{-}SiR^{10}_2H$, wherein each $R^{10}$ is an independently selected substituted or unsubstituted hydrocarbyl group, g' is 0 or 1, and $R^{11}$ is a divalent linking group. $R^{11}$ may be a siloxane chain (including, for example, $-R^{10}_2SiO-$, $-R^{10}HSiO-$, and/or $-H_2SiO-$ D siloxy units) or may be a divalent hydrocarbon group. Typically, the divalent hydrocarbon group is free of aliphatic unsaturation. The divalent hydrocarbon group may be linear, cyclic, branched, aromatic, etc., or may have combinations of such structures.

When g' is 1, and when $R^{11}$ is a divalent hydrocarbon group, specific examples of the silicon hydride compound (B) include:

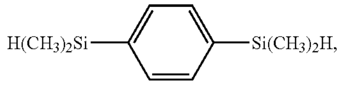

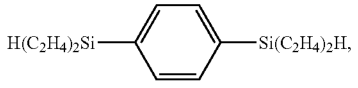

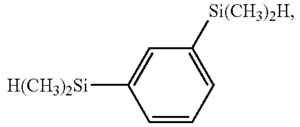

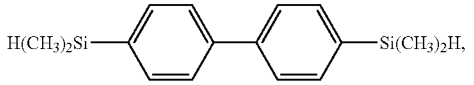

-continued

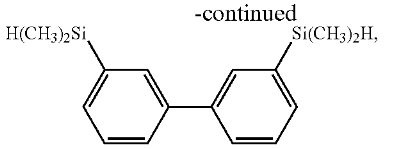

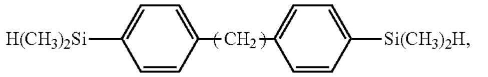 and

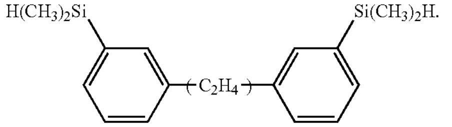

In these or other embodiments, the silicon hydride compound (B) comprises an organohydrogensiloxane, which can be a disiloxane, trisiloxane, or polysiloxane. Examples of organohydrogensiloxanes suitable for use as the silicon hydride compound (B) include, but are not limited to, siloxanes having the following formulae: $PhSi(OSiMe_2H)_3$, $Si(OSiMe_2H)_4$, $MeSi(OSiMe_2H)_3$, and $Ph_2Si(OSiMe_2H)_2$, wherein Me is methyl, and Ph is phenyl. Additional examples of organohydrogensiloxanes that are suitable for purposes of the silicon hydride compound (B) include 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly (dimethylsiloxane/methylhydrogensiloxane), and a dimethylhydrogensiloxy-terminated poly(methylhydrogensiloxane).

When the silicon hydride compound (B) comprises an organohydrogensiloxane, the silicon hydride compound (B) may comprise any combination of M, D, T and/or Q siloxy units, so long as the silicon hydride compound (B) includes at least one silicon-bonded hydrogen atom. These siloxy units can be combined in various manners to form cyclic, linear, branched and/or resinous (three-dimensional networked) structures. The silicon hydride compound (B) may be monomeric, polymeric, oligomeric, linear, branched, cyclic, and/or resinous depending on the selection of M, D, T, and/or Q units.

Because the silicon hydride compound (B) includes at least one silicon-bonded hydrogen atom, with reference to the siloxy units set forth above, the silicon hydride compound (B) may comprise any of the following siloxy units including silicon-bonded hydrogen atoms, optionally in combination with siloxy units which do not include any silicon-bonded hydrogen atoms: $(R^{10}{}_2HSiO_{1/2})$, $(R^{10}H_2SiO_{1/2})$, $(H_3SiO_{1/2})$, $(R^{10}HSiO_{2/2})$, $(H_2SiO_{2/2})$, and/or $(HSiO_{3/2})$, where $R^{10}$ is independently selected and defined above.

In specific embodiments, for example when the silicon hydride compound (B) is linear, the silicon hydride compound (B) may have the average formula:

$$(R^{10}{}_3SiO_{1/2})_{e''}(R^{10}{}_2SiO_{2/2})_{f'''}(R^{10}HSiO_{2/2})_{g''},$$

wherein each $R^{10}$ is independently hydrogen or $R^8$, where each $R^8$ is independently selected and defined above, and e"≥2, f'"≥0, and g"≥2. In specific embodiments, e" is from 2 to 10, alternatively from 2 to 8, alternatively from 2 to 6. In these or other embodiments, f'" is from 0 to 1,000, alternatively from 1 to 500, alternatively from 1 to 200. In these or other embodiments, g" is from 2 to 500, alternatively from 2 to 200, alternatively from 2 to 100.

In one embodiment, the silicon hydride compound (B) is linear and includes one or more pendent silicon-bonded hydrogen atoms. In these embodiments, the silicon hydride compound (B) may be a dimethyl, methyl-hydrogen polysiloxane having the average formula;

$$(CH_3)_3SiO[(CH_3)_2SiO]_{f'''}[(CH_3)HSiO]_{g''}Si(CH_3)_3$$

where f'" and g" are defined above.

In these or other embodiments, the silicon hydride compound (B) is linear and includes terminal silicon-bonded hydrogen atoms. In these embodiments, the silicon hydride compound (B) may be an SiH terminal dimethyl polysiloxane having the average formula:

$$H(CH_3)_2SiO[(CH_3)_2SiO]_{f'''}Si(CH_3)_2H$$

where f'" is as defined above. The SiH terminal dimethyl polysiloxane may be utilized alone or in combination with the dimethyl, methyl-hydrogen polysiloxane disclosed immediately above.

Further, the SiH terminal dimethyl polysiloxane may have one trimethylsiloxy terminal such that the SiH terminal dimethyl polysiloxane may have only one silicon-bonded hydrogen atom.

Alternatively still, the (B) organohydrogensiloxane may include both pendent and terminal silicon-bonded hydrogen atoms.

In certain embodiments, the silicon hydride compound (B) may have one of the following average formulas:

$$(R^{10}{}_3SiO_{1/2})_{e''}(R^8{}_2SiO_{2/2})_{f'''}(R^8HSiO_{2/2})_{g''}(R^8SiO_{3/2})_h,$$

$$(R^{10}{}_3SiO_{1/2})_{e''}(R^8{}_2SiO_{2/2})_{f'''}(R^8HSiO_{2/2})_{g''}(SiO_{4/2})_i,$$

$$(R^{10}{}_3SiO_{1/2})_{e''}(R^8{}_2SiO_{2/2})_{f'''}(R^8HSiO_{2/2})_{g''}(R^8SiO_{3/2})_h(SiO_{4/2})_i,$$

wherein each $R^{10}$ and $R^8$ is independently selected and defined above, e", f'", and g" are defined above, and h≥0, and i is ≥0. In each of the average formulas above, the sum of the subscripts is 1.

Some of the average formulas above for the silicon hydride compound (B) are resinous when the silicon hydride compound (B) includes T siloxy units (indicated by subscript h) and/or Q siloxy units (indicated by subscript i). When the silicon hydride compound (B) is resinous, the silicon hydride compound (B) is typically a copolymer including T siloxy units and/or Q siloxy units, in combination with M siloxy units and/or D siloxy units. For example, the organohydrogenpolysiloxane resin can be a DT resin, an MT resin, an MDT resin, a DTQ resin, an MTQ resin, an MDTQ resin, a DQ resin, an MQ resin, a DTQ resin, an MTQ resin, or an MDQ resin.

In various embodiments in which the silicon hydride compound (B) is resinous, or comprises an organopolysiloxane resin, the silicon hydride compound (B) typically has the formula:

$$(R^{12}{}_3SiO_{1/2})_{j'}(R^{12}{}_2SiO_{2/2})_{k'}(R^{12}SiO_{3/2})_{l'}(SiO_{4/2})_{m''} \quad (IV)$$

wherein each $R^{12}$ independently is H or a substituted or unsubstituted hydrocarbyl group, with the proviso that in one molecule, at least one $R^{12}$ is H; and wherein 0≤j'≤1; 0≤k'≤1; 0≤l'≤1; and 0≤m"≤1; with the proviso that j'+k'+l'+m"=1.

In certain embodiments, the silicon hydride compound (B) may comprise an alkylhydrogen cyclosiloxane or an alkylhydrogen dialkyl cyclosiloxane copolymer, represented in general by the formula $(R^{12}{}_2SiO)_{r'}(R^{12}HSiO)_{s'}$, where $R^{12}$ is independently selected and defined above, and where r' is an integer from 0-7 and s' is an integer from 3-10.

Specific examples of suitable organohydrogensiloxanes of this type include $(OSiMeH)_4$, $(OSiMeH)_3(OSiMeC_6H_{13})$, $(OSiMeH)_2(OSiMeC_6H_{13})_2$, and $(OSiMeH)(OSiMeC_6H_{13})_3$, where Me represents methyl ($—CH_3$).

The silicon hydride compound (B) can be a single silicon hydride compound or a combination comprising two or more different silicon hydride compounds.

Finally, in a third embodiment, both proviso (1) and proviso (2) are true such that the unsaturated compound (A) also includes at least one silicon-bonded hydrogen atom per molecule, and the composition further comprises (B) a silicon hydride compound including at least one silicon-bonded hydrogen atom per molecule. Examples of suitable unsaturated compounds and silicon hydride compounds for this third embodiment are set forth above.

The unsaturated compound (A), as well as the silicon hydride compound (B), if present in the composition, may be disposed in a carrier vehicle. Examples of carrier vehicles are described.

The composition may comprise the unsaturated compound (A) and the silicon hydride compound (B), when present, in varying amounts or ratios contingent on desired properties or end use application of the composition. In various embodiments when the composition comprises components (A) and (B), the composition comprises components (A) and (B) in an amount to provide a mole ratio of silicon-bonded hydrogen atoms to aliphatically unsaturated groups of from 0.3 to 5, alternatively from 0.6 to 3.

The composition further comprises (C) the catalyst as described above and/or ($C^1$) the encapsulated catalyst as described above.

The catalyst (C) and/or the encapsulated catalyst ($C^1$) is present in the composition in a catalytic amount, i.e., an amount or quantity sufficient to promote a reaction or curing thereof at desired conditions. The catalytic amount of the catalyst (C) and/or the encapsulated catalyst ($C^1$) may be greater than 0.01 ppm, and may be greater than 1,000 ppm (e.g., up to 10,000 ppm or more). In certain embodiments, the typical catalytic amount of catalyst (C) and/or the encapsulated catalyst ($C^1$) is less than 5,000 ppm, alternatively less than 2,000 ppm, alternatively less than 1,000 ppm (but in any case greater than 0 ppm). In specific embodiments, the catalytic amount of the catalyst (C) and/or the encapsulated catalyst ($C^1$) may range from 0.01 to 1,000 ppm, alternatively from 0.01 to 100, alternatively from 0.01 to 50, alternatively from 5 to 50, alternatively from 10 to 40, alternatively from 15 to 35, ppm of metal based on the weight of components in the composition. The ranges may relate solely to the metal (i.e., platinum) content within the catalyst (C) and/or the encapsulated catalyst ($C^1$). As understood in the art, the catalytic amount of the catalyst may be a function of the selection of components (A) and (B).

The composition may further comprise one or more optional components, including adhesion promoters, carrier vehicles, dyes, pigments, anti-oxidants, heat stabilizers, flame retardants, flow control additives, biocides, fillers (including extending and reinforcing fillers), surfactants, thixotroping agents, organopolysiloxanes, water, carrier vehicles or solvents, pH buffers, etc. In certain embodiments, the composition is free from any hydrosilylation inhibitors. The composition may be in any form and may be incorporated into further compositions, e.g. as a component of a composition. For example, the composition may be in the form of, or incorporated into, an emulsion. The emulsion may be an oil-in-water emulsion, water-in-oil emulsion, silicone-in-oil emulsion, etc. The composition itself may be a continuous or discontinuous phase of such an emulsion.

The composition may be prepared by combining components (A), (B), and (C) and/or ($C^1$), along with any optional components, in any order of addition, optionally with a master batch, and optionally under shear.

A method of preparing a hydrosilylation reaction product is also provided. The hydrosilylation reaction product is formed from the composition and may take a variety of forms depending on a section of the components in the composition.

The method comprises reacting an aliphatically unsaturated group and a silicon-bonded hydrogen atom in the presence of the catalyst (C) and/or the encapsulated catalyst ($C^1$). The catalyst (C) and/or the encapsulated catalyst ($C^1$) can be utilized in any hydrosilylation reaction, e.g. in lieu of or in addition to conventional hydrosilylation catalysts.

The aliphatically unsaturated group is present in the unsaturated compound (A). At least one of the following two provisos applies: (1) the unsaturated compound (A) also includes at least one silicon-bonded hydrogen atom per molecule; and/or (2) the silicon-bonded hydrogen atom is present in the silicon hydride (B) compound separate from the unsaturated compound (A). In a first embodiment, the proviso (1) is true such that the unsaturated compound (A) also includes at least one silicon-bonded hydrogen atom per molecule. In a second embodiment, the proviso (2) is true such that the composition further comprises (B) a silicon hydride compound including at least one silicon-bonded hydrogen atom per molecule. Finally, in a third embodiment, both proviso (1) and proviso (2) are true such that the unsaturated compound (A) also includes at least one silicon-bonded hydrogen atom per molecule, and that the composition further comprises the silicon hydride compound (B) including at least one silicon-bonded hydrogen atom per molecule. These embodiments are described in detail above with respect to the composition itself.

The hydrosilylation-reaction product prepared via the method is not limited and is generally a function of the unsaturated compound (A) and, if utilized, the silicon hydride compound (B). For example, the hydrosilylation-reaction product may be monomeric, oligomeric, polymeric, resinous, etc. The hydrosilylation-reaction product may comprise a fluid, an oil, a gel, an elastomer, a rubber, a resin, etc. The hydrosilylation-reaction product may take any form, as understood in the art, based on the selection of the unsaturated compound (A) and, if utilized, the silicon hydride compound (B).

The hydrosilylation-reaction product may also include various byproducts formed via the hydrosilylation reaction. For example, the hydrosilylation-reaction product typically includes a target species and various byproducts. The hydrosilylation-reaction product may also include other components, e.g. a carrier or solvent, if the method and reaction is carried out therein and/or if the composition includes such components. The method may further comprise isolating the target species, e.g. via any suitable purification method.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

The following examples are intended to illustrate the invention and are not to be viewed in any way as limiting to the scope of the invention.

EXAMPLES

Certain components utilized in the Examples are set forth in Table 1 below.

TABLE 1

| Components/Compounds Utilized | |
|---|---|
| Component | Description |
| Ligand Precursor | 3-(trimethoxysilyl)propyl bicyclo[2.2.1]hept-5-ene-2-carboxylate 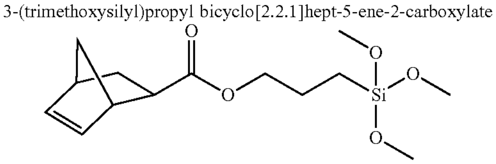 |
| Ligand Precursor 2 | di(trimethylolpropane) tetra-(norborn-2-ene-5-carboxylate) 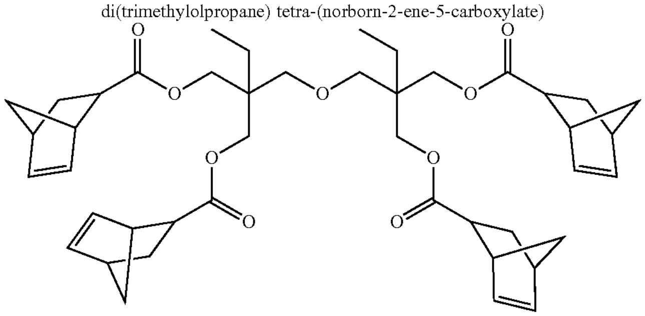 |
| Treated Silica Nanoparticles | As prepared in Preparation Example 3 |
| Ligand Functionalized Silica Nanoparticles | As prepared in Preparation Example 4 |
| Encapsulated Treated Silica Nanoparticles | As prepared in Preparation Example 5 |
| Encapsulated Ligand Functionalized Silica Nanoparticles | As prepared in Preparation Example 6 |
| Platinum Complex | Karstedt's catalyst in xylene (~2 wt. % Pt) (Platinum(0)-1,3-divinyl-1,1,3,3-tetramethyldisiloxane complex solution) |
| Unsaturated Compound (A) | 1-octene |
| Silicon Hydride (B) | $MD^HM$ (1,1,1,3,5,5,5-heptamethyltrisiloxane) |

Gas Chromatography (GC):

Gas chromatograms were collected using a Shimadzu GC-2010 Plus with a Rxi-5 ms (5% diphenyl, 95% dimethyl polysiloxane) column (14.5 m, 0.25 mm ID). An internal standard of decane was used to quantify conversion. The split ratio was 20:1. The temperature ramp and elution times utilized in GC are below in Tables 2 and 3:

TABLE 2

| GC Temperature Ramp: | | |
|---|---|---|
| Rate (° C./min) | Temp (° C.) | Hold Time (min) |
| — | 50 | 1 |
| 5 | 120 | 1 |
| 40 | 225 | 1 |
| 40 | 300 | 2 |

Total Time: 23.50 min

TABLE 3

| GC Elution times of analytes: | |
|---|---|
| Analyte | Elution Time (min) |
| Unsaturated Compound (A) | 3.6 |
| Silicon Hydride (B) | 4.7 |
| Tetraethylorthosilicate | 8.5 |
| Decane (internal standard) | 8.9 |

TABLE 3-continued

| GC Elution times of analytes: | |
|---|---|
| Analyte | Elution Time (min) |
| Trimethoxy(octyl)silane | 17.64, 17.96, 18.2, 18.39 |
| Ligand Precursor | 20.15, 20.21, 20.33, 20.38, 20.48, 20.53, 20.6, 20.64 |

Inductively Coupled Plasma Mass Spectrometry (ICP-MS)

ICP-MS was utilized to determine platinum content in certain Examples below. For ICP-MS, each sample was digested with a mixture of 5 mL nitric acid (70%), 1 mL of concentrated sulfuric acid (97%), 1 mL of concentrated hydrofluoric acid, 1 mL of 30% hydrogen peroxide and 2.5 mL of Millipore water to give sample solutions. The sample solutions were then placed in a OEM MARS6 microwave digestion system using the following parameters in Table 4:

TABLE 4

| Microwave Digestion System Parameters: | |
|---|---|
| Power | 700-1800 W |
| Temperature | 240° C. |
| Ramp Time | 30 mins |
| Hold Time | 15 mins |

After digestion, the samples solutions were diluted to final volume. Standard calibration curves ranging from 0.5-5 ppm for Pt were prepared in 2% nitric acid. Samples and standards were analyzed on a Perkin Elmer Optima 8300 ICP-OES instrument with the following operating parameters in Table 5:

TABLE 5

| Operating Parameters | |
|---|---|
| Plasma (Argon) gas flow | 10 L/min |
| Auxiliary gas flow | 0.20 L/min |
| Nebulizer gas flow | 0.80 L/min |
| RF Power | 1500 W |
| Pump flow | 1.50 ml/min |

Signal intensity was measured at both 265.945 and 214.423 nm using axial view. The wavelength that provided the lowest RSD was used to calculate the final concentration via linear regression ($R^2$>0.999). A QC standard was run after the samples, which was within ±10% of the expected concentration.

Preparation Example 1: Synthesis of Ligand Precursor 20.0 g of 3-(trimethoxysilyl)propyl acylate (0.0854 mols, 1 eq.) and 10 mL of dichloromethane were disposed in a 250 mL round-bottom flask with a side arm, and the contents of the flask were brought to reflux. While stirring, 11.3 g of cyclopentadiene (0.171 mols, 2 eq.) was added dropwise with continued refluxing for 16 hours. After removing dichloromethane and unreacted cyclopentadiene under vacuum, a final product comprising the Ligand Precursor was obtained. The relative integrations of protons in the aromatic region of the final product indicated a ratio of 75% endo isomer and 25% exo isomer of the Ligand Precursor, assigned based on the chemical shifts of similar norbornene carboxylates. $^1$H NMR ($CDCl_3$), endo: 0.61-0.69 (2H, m), 1.37-1.44 (2H, m), 1.64-1.77 (3H, m), 1.85-1.93 (1H, m), 2.85-2.97 (2H, m), 3.20 (1H, s), 3.56 (9H, s), 3.93-4.02 (2H, m), 6.14-6.22 (1H, m), 5.87-5.96 (1H, m). $^1$H NMR ($CDCl_3$), exo: 0.61-0.69 (2H, m), 1.32-1.37 (2H, m), 1.48-1.52 (1H, m), 1.64-1.77 (2H, m), 2.19-2.22 (1H, m), 2.85-2.97 (2H, m), 3.03 (1H, s), 3.56 (9H, s), 4.03-4.07 (2H, m), 6.07-6.14 (2H, m).

Preparation Example 2: Synthesis of Ligand Precursor 2

7.7866 g of di(trimethylolpropane) tetraacrylate (0.0167 mols, 1 eq.) and 60 mL of dichloromethane were disposed in a 250 mL round-bottom flask with a side arm, and the contents of the flask were brought to reflux. While stirring, 13.2447 g of cyclopentadiene (0.2004 mols, 12 eq.) was added dropwise with continued refluxing for 18 hours. After removing dichloromethane and unreacted cyclopentadiene under vacuum, a final product comprising the Ligand Precursor 2 was obtained. The relative integrations of protons in the aromatic region of the final product indicated a ratio of 75% endo isomer and 25% exo isomer of the Ligand Precursor 2, assigned based on the chemical shifts of similar norbornene carboxylates. $^1$H NMR ($CDCl_3$), endo: 0.84 (6H, m), 1.26-1.49 (16H, m), 1.89 (4H, m), 2.90-3.27 (16H, m), 3.92-4.00 (8H, m), 5.89 (4H, m), 6.18 (4H, m). $^1$H NMR ($CDCl_3$), exo: 0.84 (6H, m), 1.26-1.49 (16H, m), 1.89 (4H, m), 2.90-3.27 (16H, m), 3.92-4.00 (8H, m), 6.10 (4H, m), 6.13 (4H, m).

Preparation Example 3: Synthesis of Treated Silica Nanoparticles

Silica nanoparticles were synthesized by mixing 738.5 mL of ethanol, 20.44 mL of water, and 5.75 mL of ammonia water (14.4 M) in a 1000 mL Erlenmeyer flask and stirred vigorously for 5 minutes and then gently for 30 minutes at room temperature. The addition of 35.73 mL of tetraethylorthosilicate (TEOS) and decane (1 g) followed, and the contents of the flask were stirred for an additional 72 hours. Conversion was monitored by GC. Particle size of the silica nanoparticles was determined by dynamic light scattering (DLS) (via a Malvern Nano S90).

The silica nanoparticles were functionalized (i.e., surface treated) in a flask with trimethoxy(octyl)silane by adding 1 g of decane and 0.7635 g trimethoxy(octyl)silane (3.26 mmol) to 200 g of a 1.71 wt. % silica nanoparticle (average diameter of 35 nm) dispersion in ethanol (3.42 g silica nanoparticles), corresponding to a total of ~10 μmol/m$^2$ equivalents trimethoxy(octyl)silane per total surface area of the silica nanoparticles. The contents of the flask were stirred at room temperature for 14 days, reaching 80% conversion of the trimethoxy(octyl)silane as determined by GC to give the Treated Silica Nanoparticles. Distillation was used to change solvents from ethanol to toluene via solvent exchange, resulting in a suspension of the Treated Silica Nanoparticles in toluene of 9.66 wt. % of the Treated Silica Nanoparticles.

Preparation Example 4: Synthesis of Ligand Functionalized Silica Nanoparticles Silica nanoparticles were synthesized by mixing 738.5 mL of ethanol, 20.44 mL of water, and 5.75 mL of ammonia water (14.4 M) in a 1000 mL Erlenmeyer flask and stirred vigorously for 5 minutes and then gently for 30 minutes at room temperature. The addition of 35.73 mL of tetraethylorthosilicate (TEOS) and decane (1 g) followed, and the contents of the flask were stirred for an additional 72 hours. Conversion was monitored by GC. Particle size of the silica nanoparticles was determined by dynamic light scattering (DLS) (via a Malvern Nano S90).

The silica nanoparticles were then functionalized (i.e., surface treated) with the Ligand Precursor in a flask by adding 1 g of decane and 3.3738 g of the Ligand Precursor to 623.5 g of a dispersion of silica nanoparticles in ethanol (1.68 wt. % silica nanoparticles having an average diameter of 33 nm), corresponding to a total of ~10 μmol/m$^2$ equivalents norbornene functionality per total surface area of the silica nanoparticles. The contents of the flask were stirred at room temperature until >90% conversion as determined by GC, which took ~3 days. Distillation was used to change solvents from ethanol to toluene via solvent exchange, resulting in a suspension of the Ligand Functionalized Silica Nanoparticles in toluene of 9.68 wt. % of the Ligand Functionalized Silica Nanoparticles.

Preparation Example 5: Synthesis of Encapsulated Treated Silica Nanoparticles Silica nanoparticles were synthesized by mixing 738.5 mL of ethanol, 20.44 mL of water, and 5.75 mL of ammonia water (14.4 M) in a 1000 mL Erlenmeyer flask and stirred vigorously for 5 minutes and then gently for 30 minutes at room temperature. The addition of 35.73 mL of tetraethylorthosilicate (TEOS) and decane (1 g) followed, and the contents of the flask were stirred for an additional 72 hours.

Conversion was monitored by GC. Particle size of the silica nanoparticles was determined by dynamic light scattering (DLS) (via a Malvern Nano S90).

The silica nanoparticles were functionalized (i.e., surface treated) in a flask with trimethoxy(octyl)silane by adding 1 g of decane and 0.7635 g trimethoxy(octyl)silane (3.26 mmol) to 200 g of a 1.71 wt. % silica nanoparticle (average diameter of 35 nm) dispersion in ethanol (3.42 g silica nanoparticles), corresponding to a total of ~10 μmol/$m^2$ equivalents trimethoxy(octyl)silane per total surface area of the silica nanoparticles. The contents of the flask were stirred at room temperature for 14 days, reaching 80% conversion of the trimethoxy(octyl)silane as determined by GC to give the Treated Silica Nanoparticles. Distillation was used to change solvents from ethanol to toluene via solvent exchange, resulting in a suspension of the Treated Silica Nanoparticles in toluene of 9.66 wt. % of the Treated Silica Nanoparticles.

10 mL of toluene, 2.41 g of a 9.66 wt. % dispersion of the Treated Silica Nanoparticles in toluene (0.23 g silica), 28 μL of Platinum Complex, and 1 g of low molecular weight (~1 kg/mol) polyethylene were combined in a flask and heated to 90° C. to solubilize everything. The solution was then added dropwise into 800 mL of rapidly stirring pentane, causing immediate precipitation of the particles, resulting in a suspension of Encapsulated Treated Silica Nanoparticles in pentane. The suspension was divided into 15, 50 mL Falcon tubes and centrifuged for 1 minute at 5,000 rpm using a Sorvall ST 16 R centrifuge from Thermo Scientific. The supernatant was removed, and 3 mL of fresh pentane was added per Falcon tube to resuspend the particles and transfer them to 12, 13×100 mm glass culture tubes packed with sand inside of 25 mL Falcon tubes. After centrifugation and removal of the supernatant, 2-3 mL of pentane was used to resuspend and transfer the particles to 4 culture tubes packed inside 25 mL Falcon tubes. The suspension was centrifuged again, the supernatant removed, and 8 mL of pentane added to each culture tube. Following resuspension, centrifugation, and supernatant removal, 3 mL of 1,3-divinyltetramethyldisiloxane per culture tube was added, and the particles were resuspended. The suspension was centrifuged, the supernatant removed, and the particles resuspended in 8 mL of heptane. Centrifugation and resuspension in fresh heptane was repeated for a total of 3 heptane washes. After the last wash, 2 mL of heptane per tube was used to resuspend and transfer the particles to a scintillation vial. After settling, a gradient of particle concentration in the suspension was observed, and the top layer of clear heptane was removed with a pipette. The Encapsulated Treated Silica Nanoparticles were stored as a suspension in heptane that was 3.54 wt. % Encapsulated Treated Silica Nanoparticles after shaking for homogenization. ICP-MS analysis of a dried sample of Encapsulated Treated Silica Nanoparticles indicated a Pt wt. % of 0.034 wt. %. The wt. % of Pt in the suspension was then 0.0012 wt %.

Preparation Example 6: Synthesis of Encapsulated Ligand Functionalized Silica Nanoparticles Silica nanoparticles were synthesized by mixing 738.5 mL of ethanol, 20.44 mL of water, and 5.75 mL of ammonia water (14.4 M) in a 1000 mL Erlenmeyer flask and stirred vigorously for 5 minutes and then gently for 30 minutes at room temperature. The addition of 35.73 mL of tetraethylorthosilicate (TEOS) and decane (1 g) followed, and the contents of the flask were stirred for an additional 72 hours. Conversion was monitored by GC. Particle size of the silica nanoparticles was determined by dynamic light scattering (DLS) (via a Malvern Nano S90).

The silica nanoparticles were then functionalized (i.e., surface treated) with the Ligand Precursor in a flask by adding 1 g of decane and 3.3738 g of the Ligand Precursor to 623.5 g of a dispersion of silica nanoparticles in ethanol (1.68 wt. % Treated Silica Nanoparticles having an average diameter of 33 nm), corresponding to a total of ~10 μmol/$m^2$ equivalents norbornene functionality per total surface area of the silica nanoparticles. The contents of the flask were stirred at room temperature until >90% conversion as determined by GC, which took ~3 days. Distillation was used to change solvents from ethanol to toluene via solvent exchange, resulting in a suspension of the Ligand Functionalized Silica Nanoparticles in toluene of 9.68 wt. % of the Ligand Functionalized Silica Nanoparticles.

10 mL of toluene, 2.44 g of a 9.68 wt. % dispersion of the Ligand Functionalized Silica Nanoparticles in toluene (0.23 g silica), 28 μL of Platinum Complex, and 1 g of low molecular weight (~1 kg/mol) polyethylene were combined in a flask and heated to 90° C. to solubilize everything. The solution was then added dropwise into 800 mL of rapidly stirring pentane, causing immediate precipitation of the particles, resulting in a suspension of Encapsulated Ligand Functionalized Silica Nanoparticles in pentane. The suspension was divided into 15, 50 mL Falcon tubes and centrifuged for 1 minute at 5,000 rpm using a Sorvall ST 16 R centrifuge from Thermo Scientific. The supernatant was removed, 3 mL of and fresh pentane was added per Falcon tube to resuspend the particles and transfer them to 12, 13×100 mm glass culture tubes packed with sand inside of 25 mL Falcon tubes. After centrifugation and removal of the supernatant, 2-3 mL of pentane was used to resuspend and transfer the particles to 4 culture tubes packed inside 25 mL Falcon tubes. The suspension was centrifuged again, the supernatant removed, and 8 mL of pentane added to each culture tube. Following resuspension, centrifugation, and supernatant removal, 3 mL of 1,3-divinyltetramethyldisiloxane per culture tube was added, and the particles were resuspended. The suspension was centrifuged, the supernatant removed, and the particles resuspended in 8 mL of heptane. Centrifugation and resuspension in fresh heptane was repeated for a total of 3 heptane washes. After the last wash, 2 mL of heptane per tube was used to resuspend and transfer the particles to a scintillation vial. After settling, a gradient of particle concentration in the suspension was observed, and the top layer of clear heptane was removed with a pipette. The Encapsulated Ligand Functionalized Silica Nanoparticles were stored as a suspension in heptane that was 2.28 wt. % Ligand Functionalized Silica Nanoparticles after shaking for homogenization. ICP-MS analysis of a dried sample of particles indicated a Pt wt. % of 0.06 wt. %. The wt. % of Pt in the suspension was then 0.0014 wt. %

Example 1

0.6312 g Unsaturated Compound (A) (5.625 mmol, 1 eq.), 1.2516 g Silicon Hydride (B) (5.625 mmol, 1 eq.), 5 mL heptane, and 0.1 g decane were disposed in a 20 mL scintillation vial, degassed with Argon, and placed into an Argon atmosphere glove box. A catalyst blend was prepared by combining and equilibrating for 30 minutes 0.1135 g of a dispersion of the Ligand Functionalized Silica Nanoparticles (as prepared in Preparation Example 4) and 78 μL of 0.016% Pt solution (5 ppm Pt) to give 146 eq. norbornene per 1 eq. platinum in the catalyst blend. The Pt solution was prepared by diluting 0.1149 g of Platinum Complex with an additional 14.9786 g of o-xylene. The catalyst blend was disposed in the vial to initiate hydrosilylation. To monitor reaction kinetics, a needle and syringe were utilized to extract ~0.01 mL aliquots from the reaction mixture, which were quenched in 1.5 mL of pentane and analyzed via GC. One aliquot was taken prior to catalyst addition. Subsequent aliquots were taken 1, 5, 10, 15, 20, 30, 60, 120, 180, and 1440 minutes after catalyst addition. Reaction kinetics are shown in FIG. 1 for Example 1, plotting conversion of the Silicon Hydride (B) as a function of time. In FIG. 1, 0.1 means 10% conversion, 0.2 means 20% conversion, and so on.

Example 2

0.6312 g Unsaturated Compound (A) (5.625 mmol, 1 eq.), 1.2516 g Silicon Hydride (B) (5.625 mmol, 1 eq.), 5 mL heptane, and 0.1 g decane were disposed in a 20 mL scintillation vial, degassed with Argon, and placed into an Argon atmosphere glove box. A catalyst blend was prepared by combining and equilibrating for 30 minutes 0.2839 g of a dispersion of the Ligand Functionalized Silica Nanoparticles (as prepared in Preparation Example 4) and 78 μL of 0.016% Pt solution (5 ppm Pt) to give 364 eq. norbornene per 1 eq. platinum in the catalyst blend. The Pt solution was prepared by diluting 0.1149 g of Platinum Complex with an additional 14.9786 g of o-xylene. The catalyst blend was disposed in the vial to initiate hydrosilylation. To monitor reaction kinetics, a needle and syringe were utilized to extract ~0.01 mL aliquots from the reaction mixture, which were quenched in 1.5 mL of pentane and analyzed via GC. One aliquot was taken prior to catalyst addition. Subsequent aliquots were taken 1, 5, 10, 15, 20, 30, 60, 120, 180, and 1440 minutes after catalyst addition. Reaction kinetics are shown in FIG. 1 for Example 2, plotting conversion of the Silicon Hydride (B) as a function of time. In FIG. 1, 0.1 means 10% conversion, 0.2 means 20% conversion, and so on.

Example 3

0.6312 g Unsaturated Compound (A) (5.625 mmol, 1 eq.), 1.2516 g Silicon Hydride (B) (5.625 mmol, 1 eq.), 5 mL heptane, and 0.1 g decane were disposed in a 20 mL scintillation vial, degassed with Argon, and placed into an Argon atmosphere glove box. A catalyst blend was prepared by combining and equilibrating for 30 minutes 0.5685 g of a dispersion of the Ligand Functionalized Silica Nanoparticles dispersion (as prepared in Preparation Example 4) and 78 μL of 0.016% Pt solution (5 ppm Pt) to give 729 eq. norbornene per 1 eq. platinum in the catalyst blend. The Pt solution was prepared by diluting 0.1149 g of Platinum Complex with an additional 14.9786 g of o-xylene. The catalyst blend was disposed in the vial to initiate hydrosilylation. To monitor reaction kinetics, a needle and syringe were utilized to extract ~0.01 mL aliquots from the reaction mixture, which were quenched in 1.5 mL of pentane and analyzed via GC. One aliquot was taken prior to catalyst addition. Subsequent aliquots were taken 1, 5, 10, 15, 20, 30, 60, 120, 180, and 1440 minutes after catalyst addition. Reaction kinetics are shown in FIG. 1 for Example 3, plotting conversion of the Silicon Hydride (B) as a function of time. In FIG. 1, 0.1 means 10% conversion, 0.2 means 20% conversion, and so on.

Example 4

Figure 2:
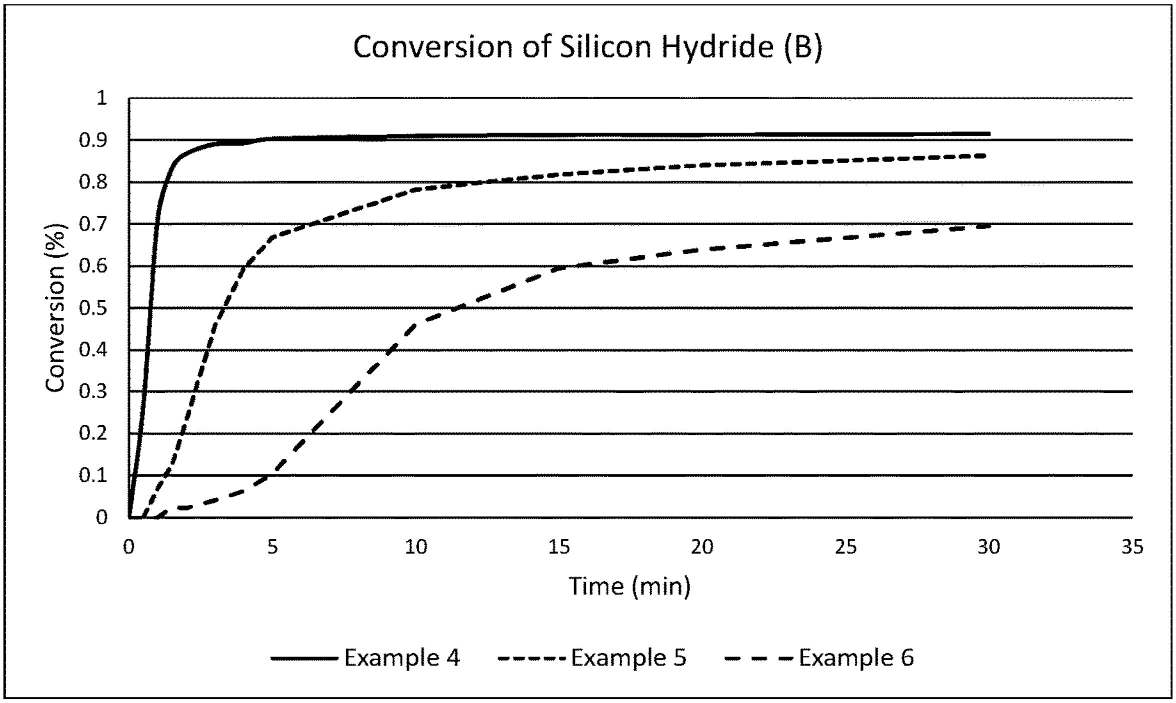
FIG. 2 shows hydrosilylation reaction kinetics for Example 4-6, plotting conversion of Silicon Hydride (B) as a function of time.

The procedure of Example 1, including the components and their amounts, was repeated in Example 4. However, in Example 4, the contents of the vial were heated to 70° C. prior to addition of the catalyst blend. Aliquots were taken 0, 0.5, 1, 1.5, 2, 3, 4, 5, 10, 15, 20, and 30 minutes after catalyst addition. Reaction kinetics are shown in FIG. 2 for Example 4, plotting conversion of the Silicon Hydride (B) as a function of time. In FIG. 2, 0.1 means 10% conversion, 0.2 means 20% conversion, and so on.

Example 5

The procedure of Example 2, including the components and their amounts, was repeated in Example 5. However, in Example 5, the contents of the vial were heated to 70° C. prior to addition of the catalyst blend. Aliquots were taken 0, 0.5, 1, 1.5, 2, 3, 4, 5, 10, 15, 20, and 30 minutes after catalyst addition. Reaction kinetics are shown in FIG. 2 for Example 5, plotting conversion of the Silicon Hydride (B) as a function of time. In FIG. 2, 0.1 means 10% conversion, 0.2 means 20% conversion, and so on.

Example 6

The procedure of Example 3, including the components and their amounts, was repeated in Example 6. However, in Example 6, the contents of the vial were heated to 70° C. prior to addition of the catalyst blend. Aliquots were taken 0, 0.5, 1, 1.5, 2, 3, 4, 5, 10, 15, 20, and 30 minutes after catalyst addition. Reaction kinetics are shown in FIG. 2 for Example 6, plotting conversion of the Silicon Hydride (B) as a function of time. In FIG. 2, 0.1 means 10% conversion, 0.2 means 20% conversion, and so on.

Example 7

Figure 3:
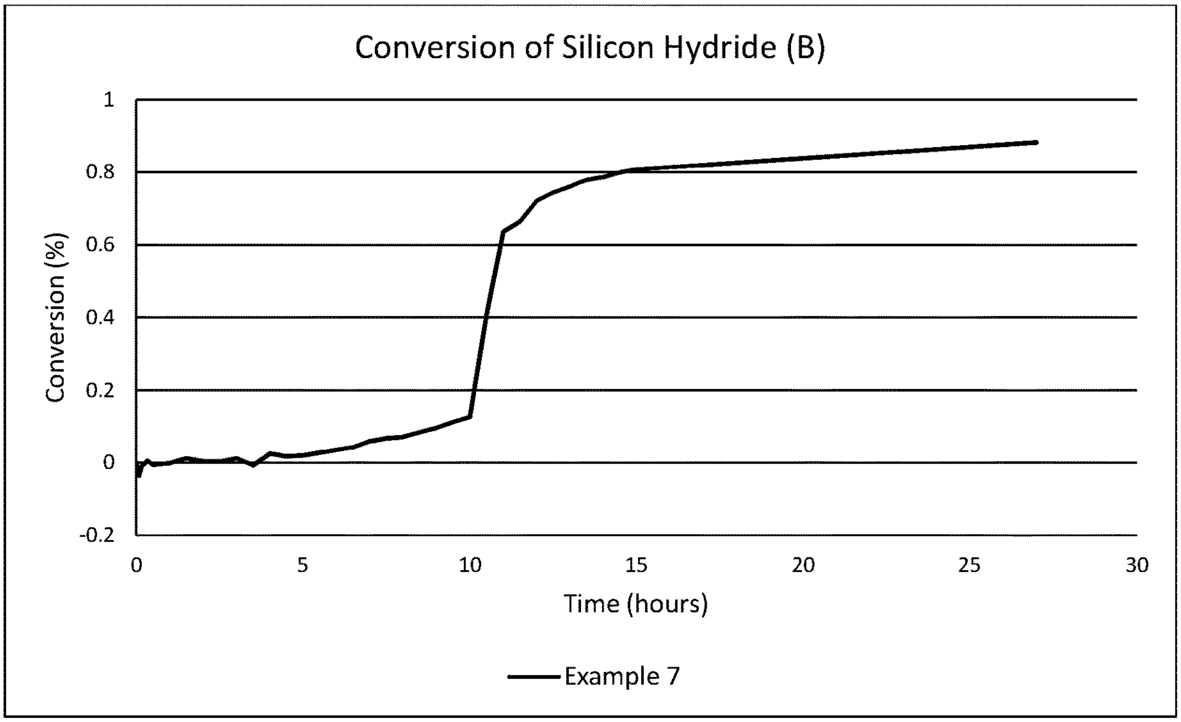
FIG. 3 shows hydrosilylation reaction kinetics for Example 7, plotting conversion of Silicon Hydride (B) as a function of time.

0.6312 g Unsaturated Compound (A) (5.625 mmol, 1 eq.), 1.2516 g Silicon Hydride (B) (5.625 mmol, 1 eq.), 5 mL heptane, and 0.1 g decane were disposed in a 20 mL scintillation vial, degassed with Argon, and placed into an Argon atmosphere glove box. Hydrosilylation was initiated by the addition of 0.8034 g of a dispersion of the Encapsulated Ligand Functionalized Silica Nanoparticles (as prepared in Preparation Example 6, 5 ppm Pt). To monitor reaction kinetics, a needle and syringe were utilized to extract ~0.01 mL aliquots from the reaction mixture, which were quenched in 1.5 mL of pentane and analyzed via GC. One aliquot was taken prior to catalyst addition. Subsequent aliquots were taken 1, 5, 10, 15, 20, 30, and 60 minutes, every half hour between 1 and 15 hours, and at 27 hours after catalyst addition. Reaction kinetics are shown in FIG. 3 for Example 7, plotting conversion of the Silicon Hydride (B) as a function of time. In FIG. 3, 0.1 means 10% conversion, 0.2 means 20% conversion, and so on.

Example 8

Figure 4:
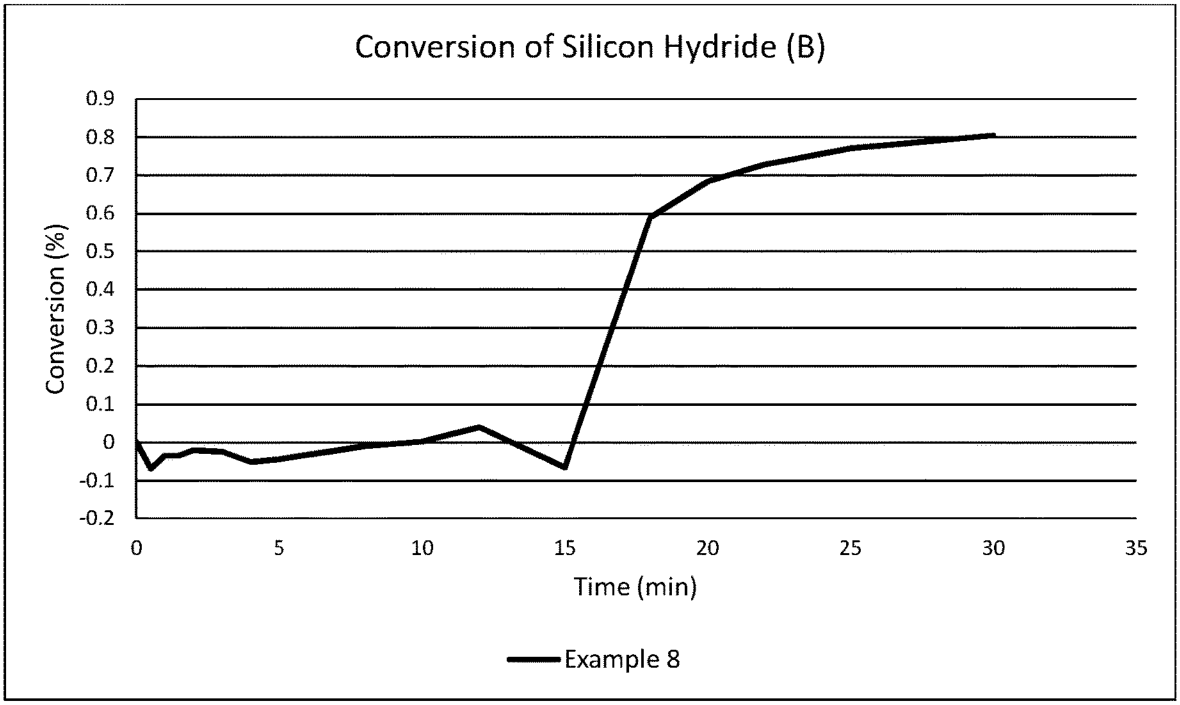
FIG. 4 shows hydrosilylation reaction kinetics for Example 8, plotting conversion of Silicon Hydride (B) as a function of time.

The procedure of Example 7, including the components and their amounts, was repeated in Example 8. However, in Example 8, the contents of the vial were heated to 70° C. prior to addition of the Encapsulated Ligand Functionalized Silica Nanoparticles. Aliquots were taken at 0, 0.5, 1, 1.5, 2, 3, 4, 5, 8, 10, 12, 15, 18, 20, 22, 25, and 30 minutes after Encapsulated Ligand Functionalized Silica Nanoparticles addition. Reaction kinetics are shown in FIG. 4 for Example 8, plotting conversion of the Silicon Hydride (B) as a function of time. In FIG. 4, 0.1 means 10% conversion, 0.2 means 20% conversion, and so on.

Comparative Example 1

Figure 5:
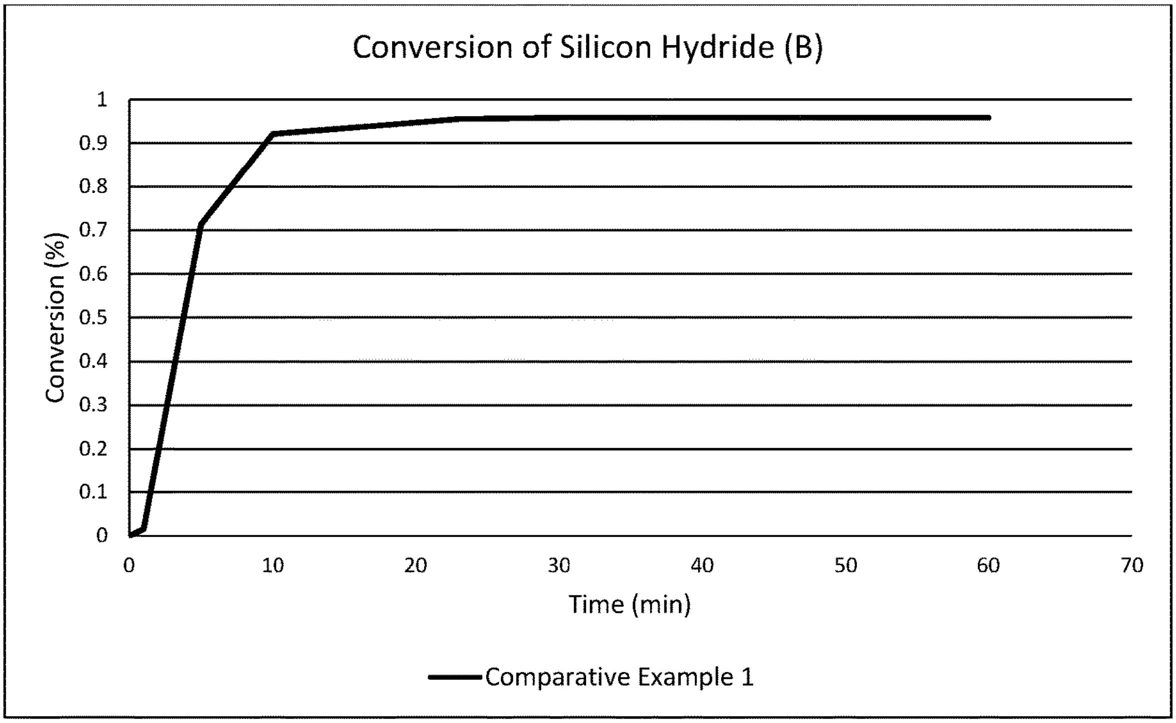
FIG. 5 shows hydrosilylation reaction kinetics for Comparative Example 1, plotting conversion of Silicon Hydride (B) as a function of time.

0.6312 g Unsaturated Compound (A) (5.625 mmol, 1 eq.), 1.2516 g Silicon Hydride (B) (5.625 mmol, 1 eq.), 5 mL heptane, and 0.1 g decane were disposed in a 20 mL scintillation vial, degassed with Argon, and placed into an Argon atmosphere glove box. Hydrosilylation was initiated by the addition of a platinum solution. The quantity of platinum solution utilized corresponded to 78 μL of 0.016 wt. % Pt (5 ppm Pt). The platinum solution was prepared by diluting 0.1149 g of Platinum Complex with an additional 14.9786 g of o-xylene. To monitor reaction kinetics, a needle and syringe were utilized to extract ~0.01 mL aliquots from the reaction mixture, which were quenched in 1.5 mL of pentane and analyzed via GC. One aliquot was taken prior to catalyst addition. Subsequent aliquots were taken 1, 5, 10, 23, 30, and 60 minutes after platinum solution addition. Reaction kinetics are shown in FIG. 5 for Comparative Example 1, plotting conversion of the Silicon Hydride (B) as a function of time. In FIG. 5, 0.1 means 10% conversion, 0.2 means 20% conversion, and so on.

Comparative Example 2

Figure 6:
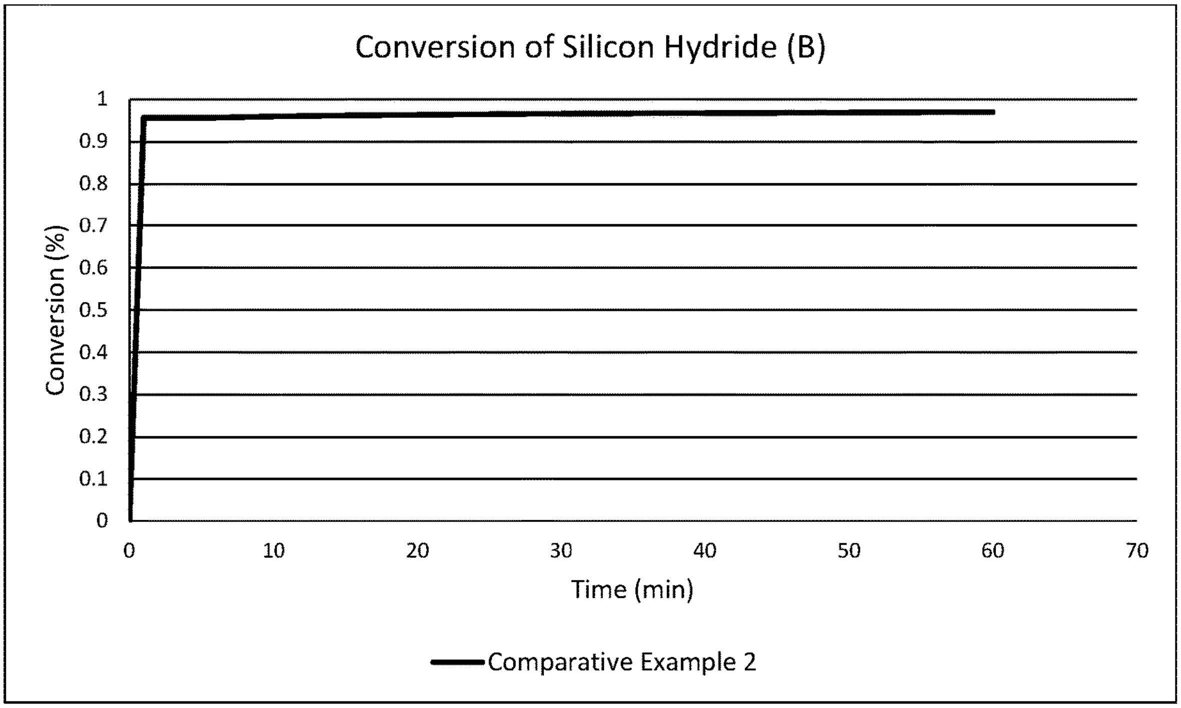
FIG. 6 shows hydrosilylation reaction kinetics for Comparative Example 2, plotting conversion of Silicon Hydride (B) as a function of time.

Comparative Example 1 was repeated, but 0.017 g of Ligand Precursor (1000 eq. relative to 1 eq. Pt.) and 0.611 g of a dispersion of the Treated Silica Nanoparticles in toluene (as prepared in Preparation Example 3) were disposed in the vial prior to incorporating the platinum solution. Aliquots were taken 0, 1, 5, 10, 15, 20, 30, and 60 minutes after platinum solution addition. Reaction kinetics are shown in FIG. 6 for Comparative Example 2, plotting conversion of the Silicon Hydride (B) as a function of time. In FIG. 6, 0.1 means 10% conversion, 0.2 means 20% conversion, and so on.

Comparative Example 3

Figure 7:
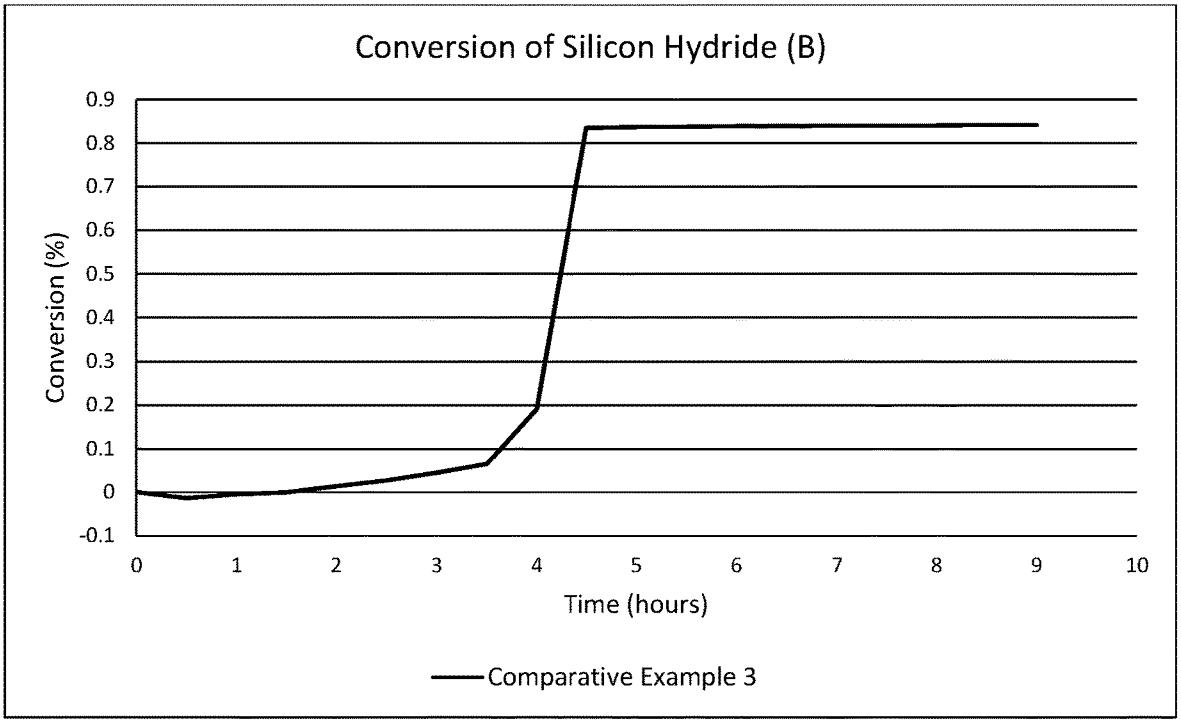
FIG. 7 shows hydrosilylation reaction kinetics for Comparative Example 3, plotting conversion of Silicon Hydride (B) as a function of time.

0.6312 g Unsaturated Compound (A) (5.625 mmol, 1 eq.), 1.2516 g Silicon Hydride (B) (5.625 mmol, 1 eq.), 5 mL heptane, and 0.1 g decane were disposed in a 20 mL scintillation vial, degassed with Argon, and placed into an Argon atmosphere glove box. Hydrosilylation was initiated by the addition of 0.9117 g of a dispersion of the Encapsulated Treated Silica Nanoparticles (as prepared in Preparation Example 5, 5 ppm Pt). To monitor reaction kinetics, a needle and syringe were utilized to extract ~0.01 mL aliquots from the reaction mixture, which were quenched in 1.5 mL of pentane and analyzed via GC. Aliquots were taken at 30-minute intervals between 0 and 6 hours as well as at 9 hours after Encapsulated Treated Silica Nanoparticles addition. Reaction kinetics are shown in FIG. 7 for Comparative Example 3, plotting conversion of the Silicon Hydride (B) as a function of time. In FIG. 7, 0.1 means 10% conversion, 0.2 means 20% conversion, and so on.

Comparative Example 4

0.6312 g Unsaturated Compound (A) (5.625 mmol, 1 eq.), 1.2516 g Silicon Hydride (B) (5.625 mmol, 1 eq.), 5 mL heptane, and 0.1 g decane were disposed in a 20 mL scintillation vial, degassed with Argon, and placed into an Argon atmosphere glove box. A catalyst blend was prepared by combining and equilibrating for 16 hours 0.1428 g of an 8.64 wt. % solution of Ligand Precursor 2 in toluene and 78 μL of 0.016% Pt solution (5 ppm Pt) to give 1000 eq. norbornene per 1 eq. platinum in the catalyst blend (250 eq.

Figure 8:
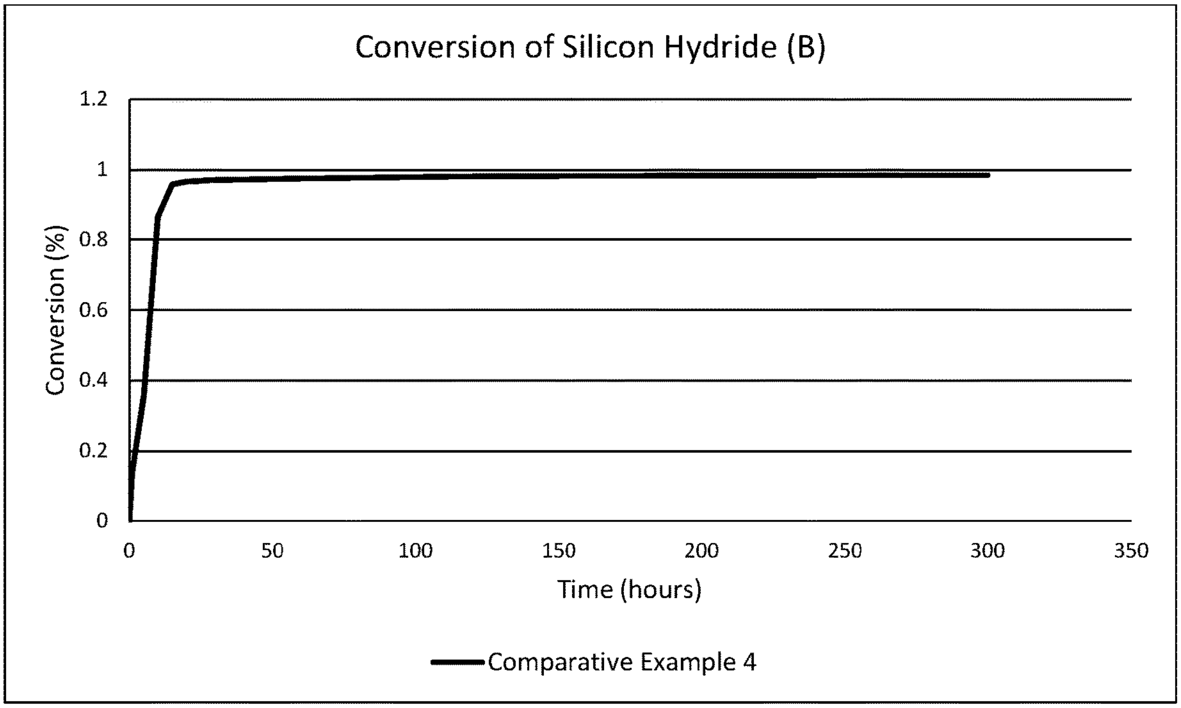
FIG. 8 shows hydrosilylation reaction kinetics for Comparative Example 4, plotting conversion of Silicon Hydride (B) as a function of time.

Ligand Precursor 2 per 1 eq. platinum). The Pt solution was prepared by diluting 0.1149 g of Platinum Complex with 14.9786 g with o-xylene. To monitor reaction kinetics, a needle and syringe were utilized to extract ~0.01 mL aliquots from the reaction mixture, which were quenched in 1.5 mL of pentane and analyzed via GC. One aliquot was taken prior to catalyst addition. Subsequent aliquots were taken 1, 5, 10, 15, 20, 30, 60, 120, 180, and 300 minutes after catalyst addition. Reaction kinetics are shown in FIG. 8 for Comparative Example 4, plotting conversion of the Silicon Hydride (B) as a function of time. In FIG. 8, 0.1 means 10% conversion, 0.2 means 20% conversion, and so on.

What is claimed is:

1. A catalyst for hydrosilylation, said catalyst comprising:

a nanoparticle having a surface;

a plurality of ligands tethered to the surface of the nanoparticle, each ligand independently having the following formula:

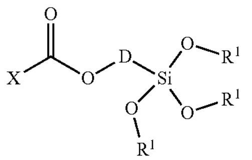

wherein each X is an independently selected cyclic aliphatic hydrocarbon group having one unsaturated moiety, each D is a divalent group, and each $R^1$ is independently selected from H, an alkyl group having from 1 to 8 carbon atoms, and a covalent bond to the surface of the nanoparticle; and platinum bonded to the unsaturated moiety of X.

2. The catalyst of claim 1, comprising the following moiety:

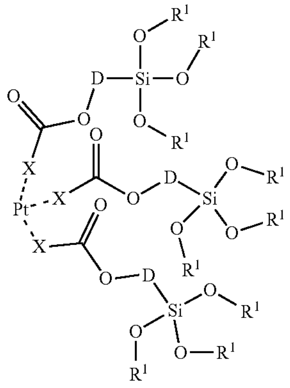

wherein each X is an independently selected cyclic aliphatic hydrocarbon group having one unsaturated moiety, each D is a divalent group, and each $R^1$ is independently selected from H, an alkyl group having from 1 to 8 carbon atoms, and a covalent bond to the surface of the nanoparticle.

3. The catalyst of claim 1, wherein, in at least one ligand: (i) X is norbornene; (ii) D is a divalent hydrocarbon group having from 1 to 8 carbon atoms; (iii) each $R^1$ is methyl, ethyl, or a covalent bond; or (iv) any combination of (i) to (iii).

4. The catalyst of claim 1, wherein: (i) the nanoparticle comprises a silica nanoparticle having a diameter of from 10 to 100 nanometers (nm); (ii) a molar ratio of X to platinum is from 50 to 1000 in the catalyst; (iii) $R^1$ is H; or (iv) any combination of (i) to (iii).

5. An encapsulated catalyst comprising the catalyst for hydrosilylation of claim 1 and a thermoplastic polyolefin layer disposed about the catalyst.

6. A method of preparing the catalyst for hydrosilylation of claim 1, said method comprising:

mixing a ligand functionalized nanoparticle and a platinum mixture to give the catalyst;

wherein the ligand functionalized nanoparticle comprises a plurality of ligands tethered to the surface of the nanoparticle, each ligand independently having the following formula:

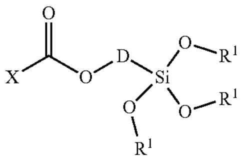

wherein each X is an independently selected cyclic aliphatic hydrocarbon group having one unsaturated moiety, each D is a divalent group, and each $R^1$ is independently selected from H, an alkyl group having from 1 to 8 carbon atoms, and a covalent bond to the surface of the nanoparticle.

7. The method of claim 6, further comprising preparing the ligand functionalized nanoparticle by combining an initial nanoparticle having a surface including at least one SiOZ functional group, where each Z is independently selected from H and an alkyl group having from 1 to 4 carbon atoms, and a plurality of ligand precursors independently having the following formula:

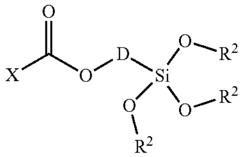

wherein each X is an independently selected cyclic aliphatic hydrocarbon group having one unsaturated moiety, each D is an independently selected divalent group, and each $R^2$ is independently selected from H and an alkyl group having from 1 to 8 carbon atoms.

8. The method of claim 7, further comprising preparing the ligand precursors by reacting a cyclic diene compound and an organosilicon compound having the following formula:

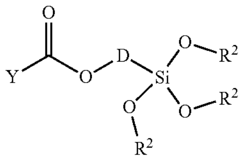

wherein each Y is an independently selected dienophilic group, each D is an independently selected divalent group, and each $R^2$ is independently selected from H and an alkyl group having from 1 to 8 carbon atoms.

9. The method of claim 6, wherein the catalyst is further defined as an encapsulated catalyst, and wherein the method further comprises encapsulating the catalyst in a thermoplastic polyolefin to give the encapsulated catalyst.

10. A composition, comprising:

(A) an unsaturated compound including at least one aliphatically unsaturated group per molecule, subject to at least one of the following two provisos:

(1) the unsaturated compound (A) also includes at least one silicon-bonded hydrogen atom per molecule; and/or (2) the composition further comprises (B) a silicon hydride compound including at least one silicon-bonded hydrogen atom per molecule; and (C) a catalyst; and/or ($C^1$) an encapsulated catalyst comprising the catalyst (C) and a thermoplastic polyolefin layer disposed about the catalyst (C);

wherein the catalyst (C) is the catalyst according to claim 1.

11. The composition of claim 10, wherein proviso (2) is true such that the composition further comprises (B) the silicon hydride compound including at least one silicon-bonded hydrogen atom per molecule.

12. The composition of claim 11, wherein: (i) the unsaturated compound (A) includes at least two unsaturated groups per molecule; (ii) the silicon hydride compound (B) includes at least two silicon-bonded hydrogen atoms per molecule; or (iii) both (i) and (ii).

13. A method of preparing a hydrosilylation reaction product, said method comprising:

reacting an aliphatically unsaturated group and a silicon-bonded hydrogen atom in the presence of (C) a catalyst and/or ($C^1$) an encapsulated catalyst to give the hydrosilylation reaction product;

wherein the aliphatically unsaturated group is present in (A) an unsaturated compound;

wherein at least one of the following two provisos applies:

(1) the unsaturated compound (A) also includes at least one silicon-bonded hydrogen atom per molecule; and/or (2) the silicon-bonded hydrogen atom is present in (B) a silicon hydride compound separate from the unsaturated compound (A);

wherein the encapsulated catalyst ($C^1$) comprises the catalyst (C) and a thermoplastic polyolefin layer disposed about the catalyst (C); and wherein the catalyst (C) comprises the catalyst according to claim 1.

14. The hydrosilylation reaction product formed in accordance with the method of claim 13.

15. A hydrosilylation-curable silicone composition comprising a catalyst, wherein the catalyst is according to claim 1, and optionally wherein a thermoplastic polyolefin layer is disposed about the catalyst.

* * * * *